March 6, 1945.  A. J. BUSCH  2,370,712
AUTOMATIC TOLL TICKETING SYSTEM
Filed Jan. 27, 1943  10 Sheets-Sheet 1
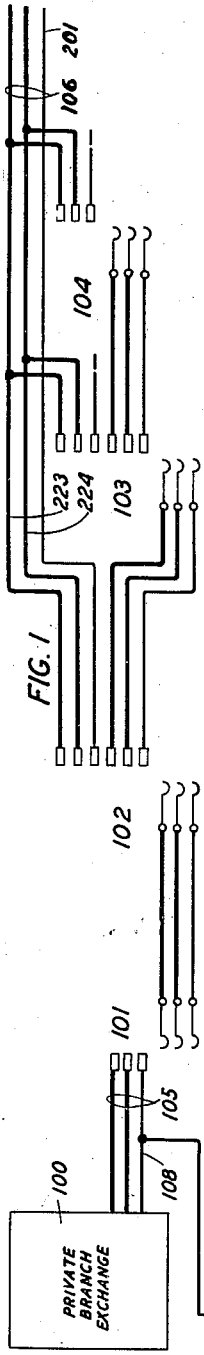
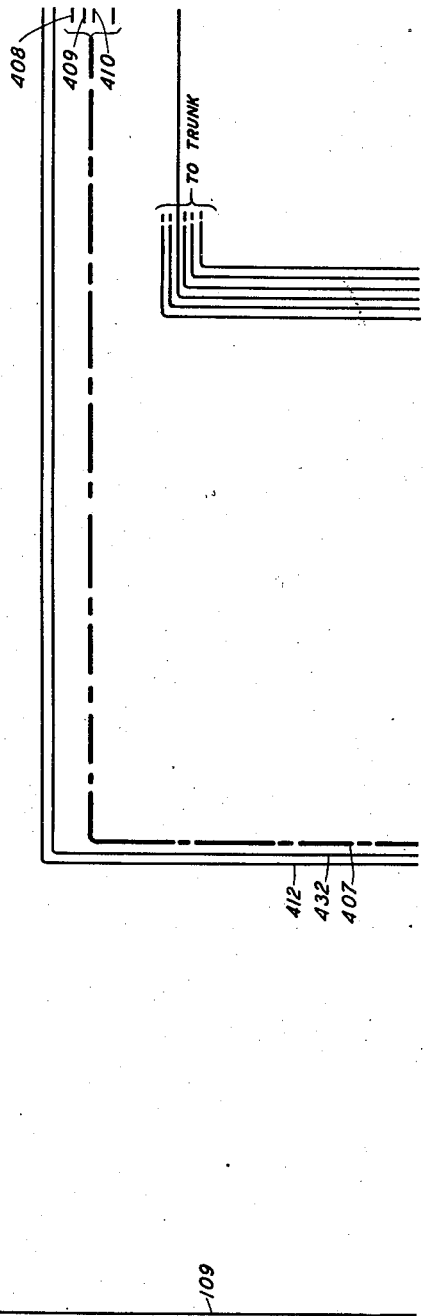
INVENTOR
A. J. BUSCH
BY
P. C. Smith
ATTORNEY

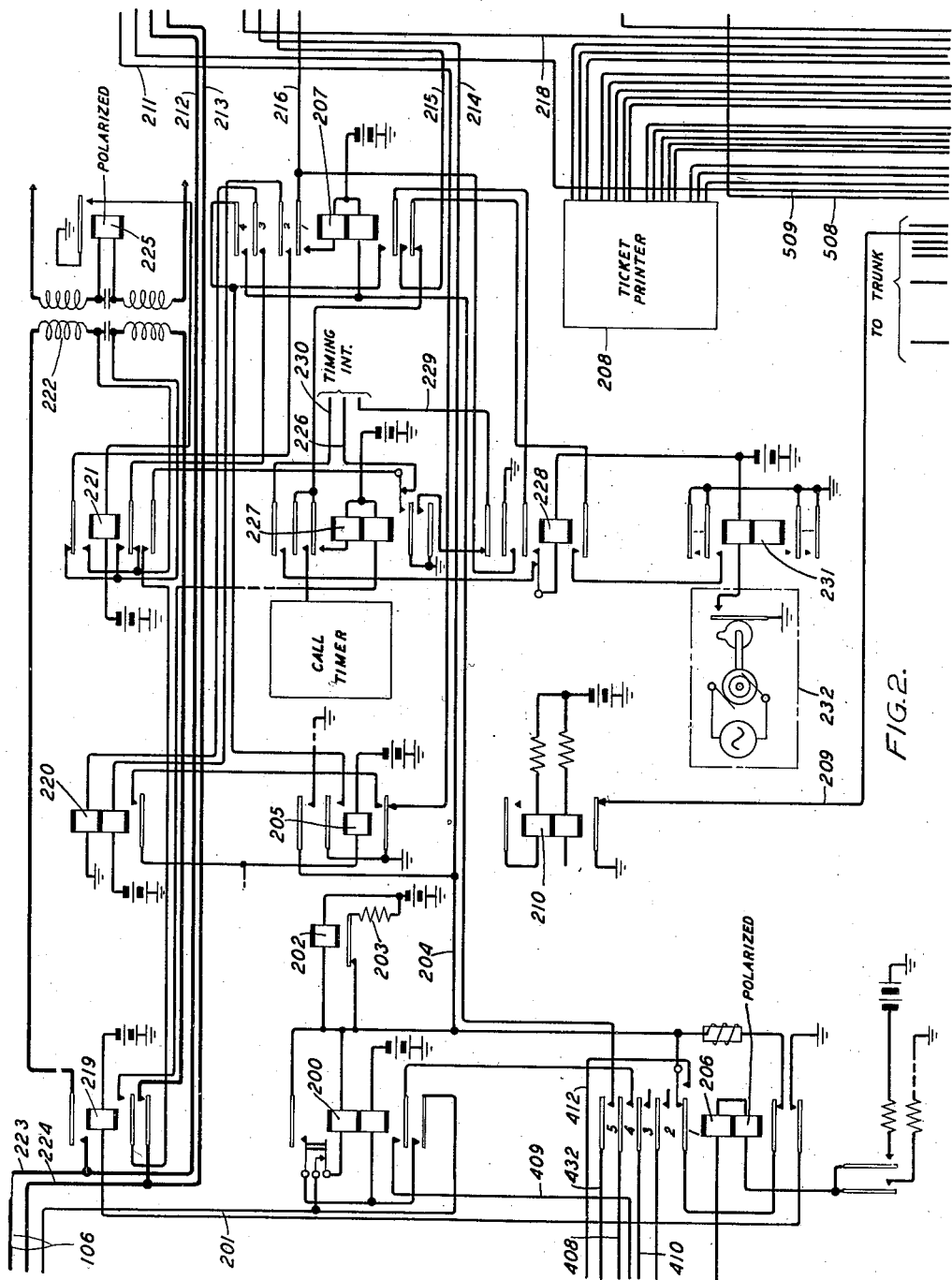

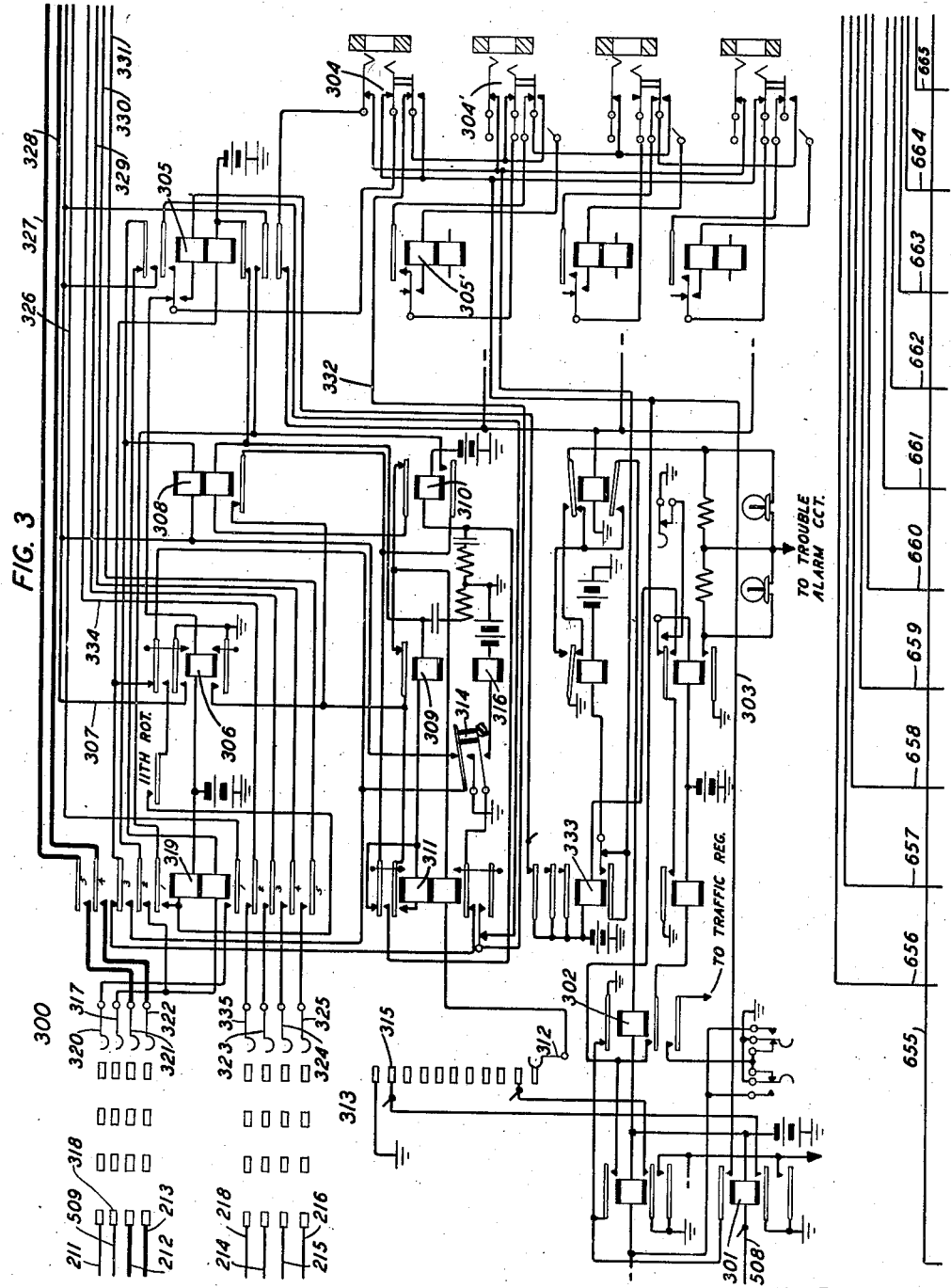

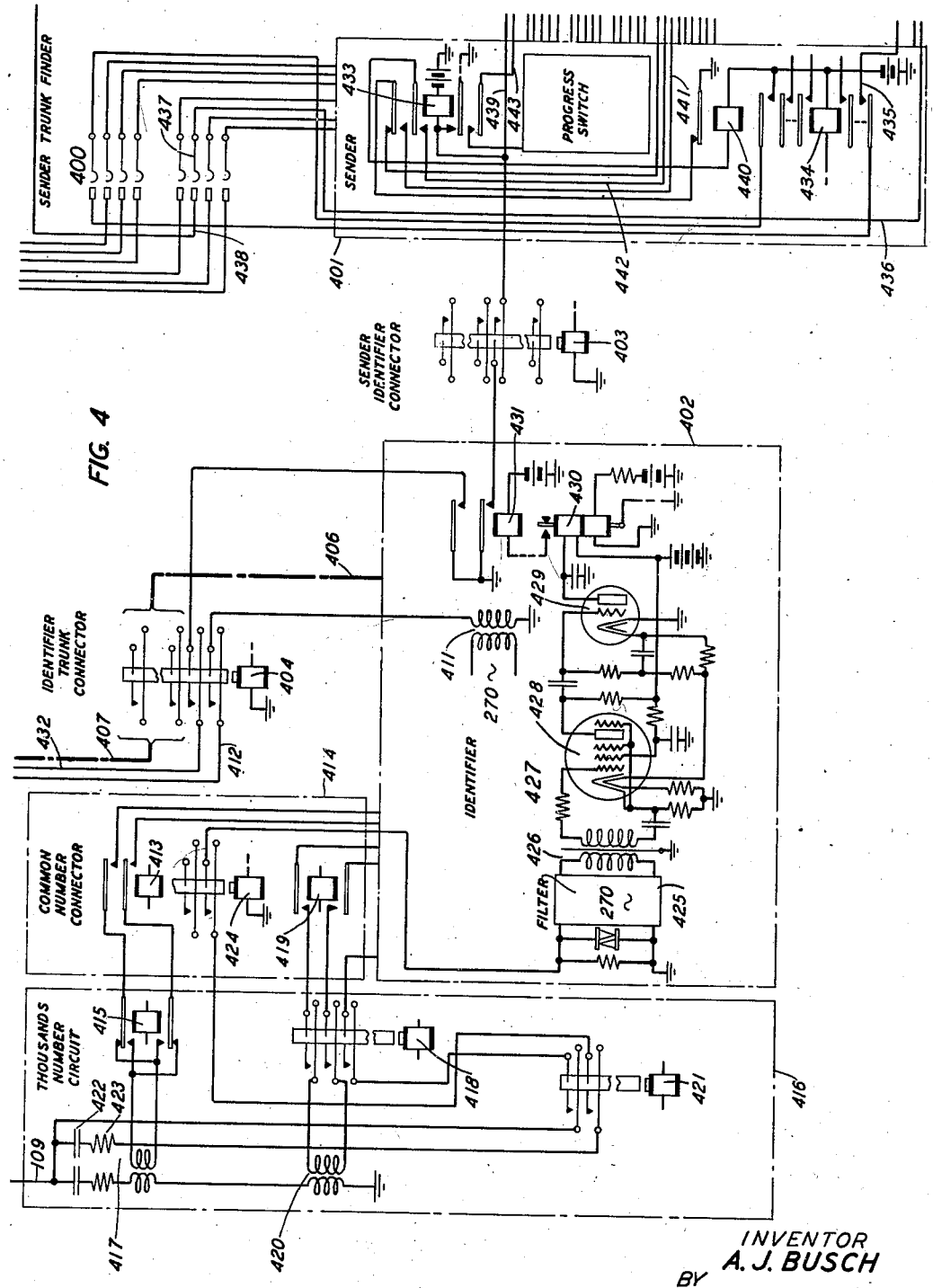

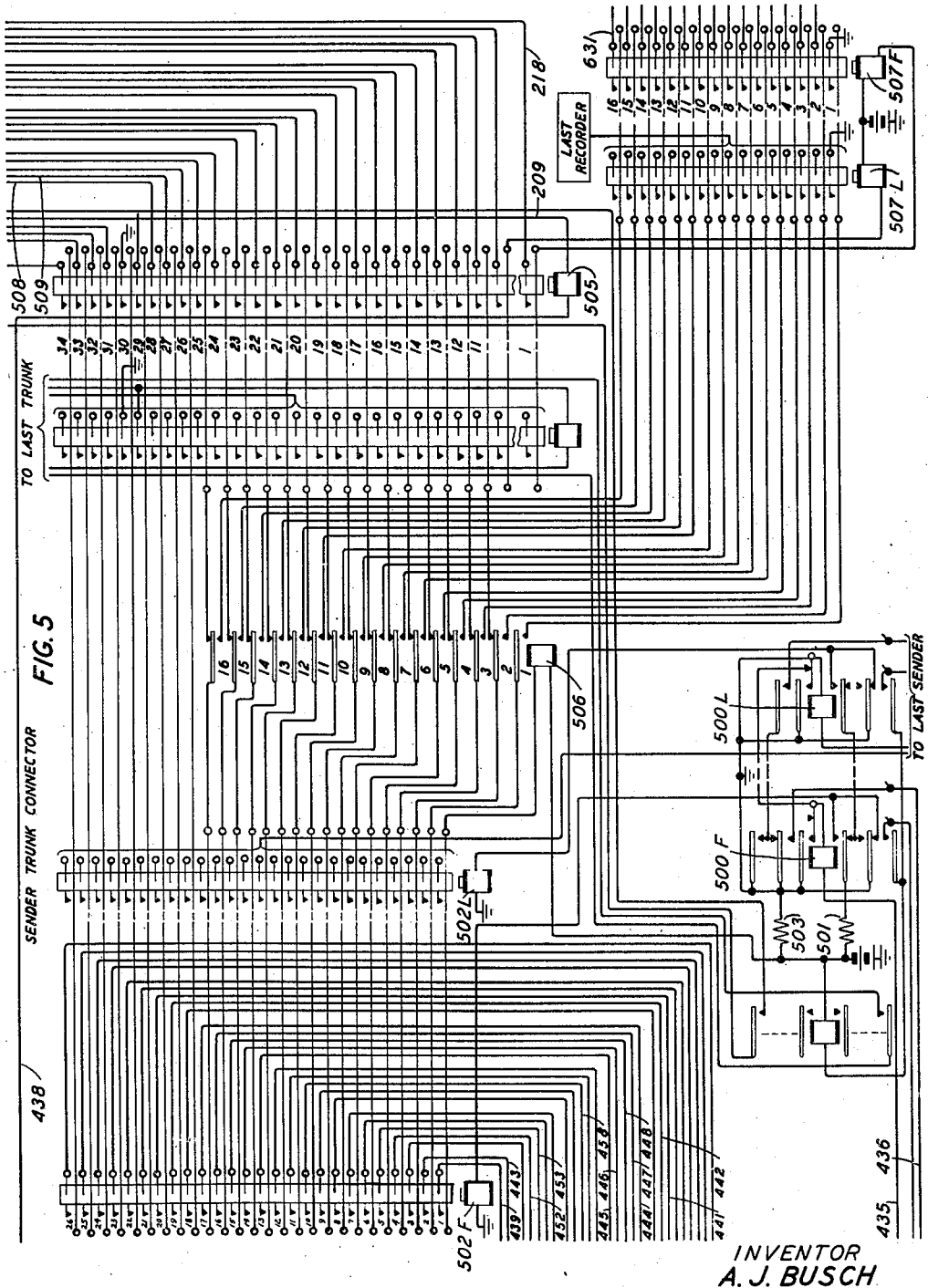

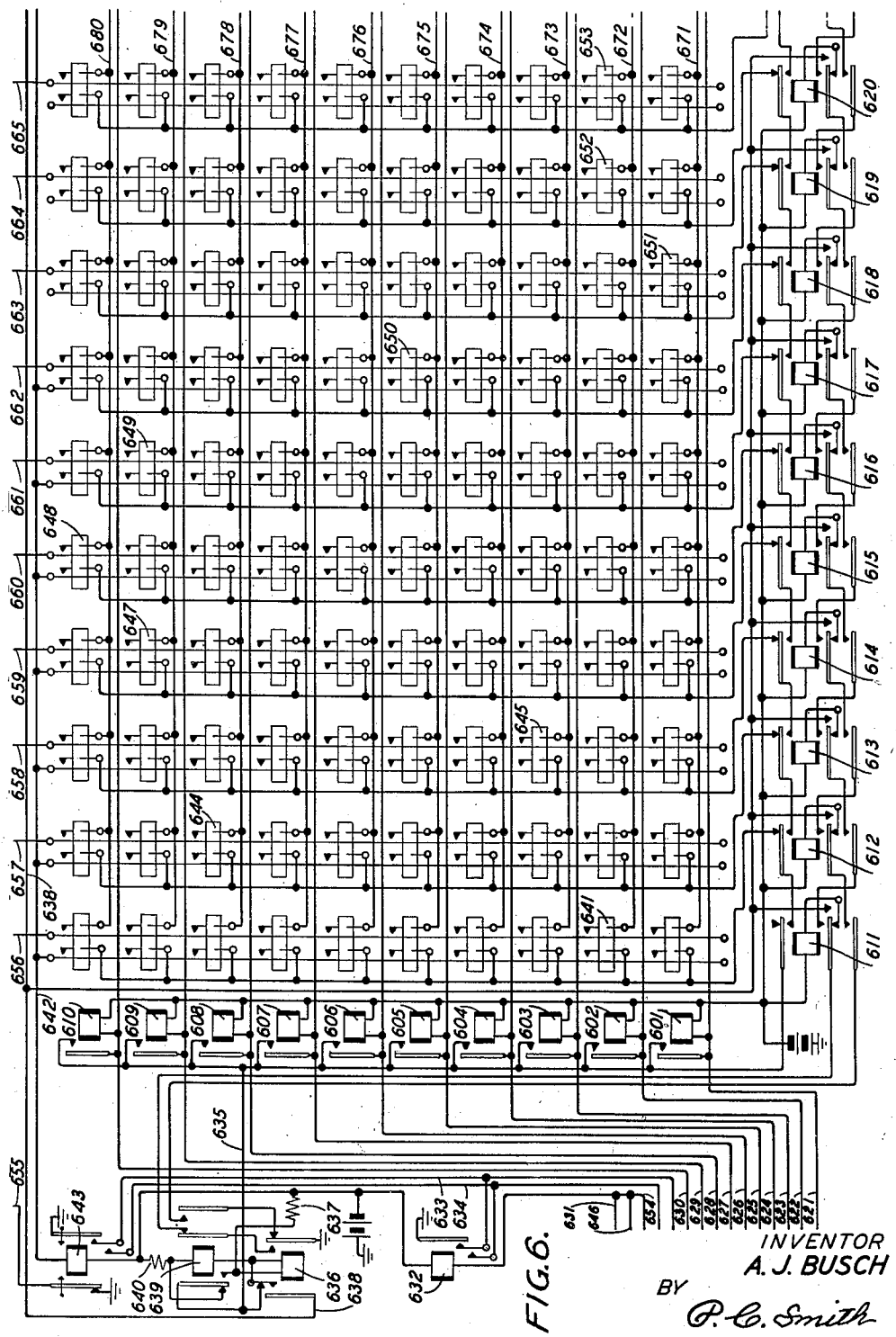

March 6, 1945. A. J. BUSCH 2,370,712
AUTOMATIC TOLL TICKETING SYSTEM
Filed Jan. 27, 1943 10 Sheets-Sheet 8

INVENTOR
A. J. BUSCH
BY
P. C. Smith
ATTORNEY

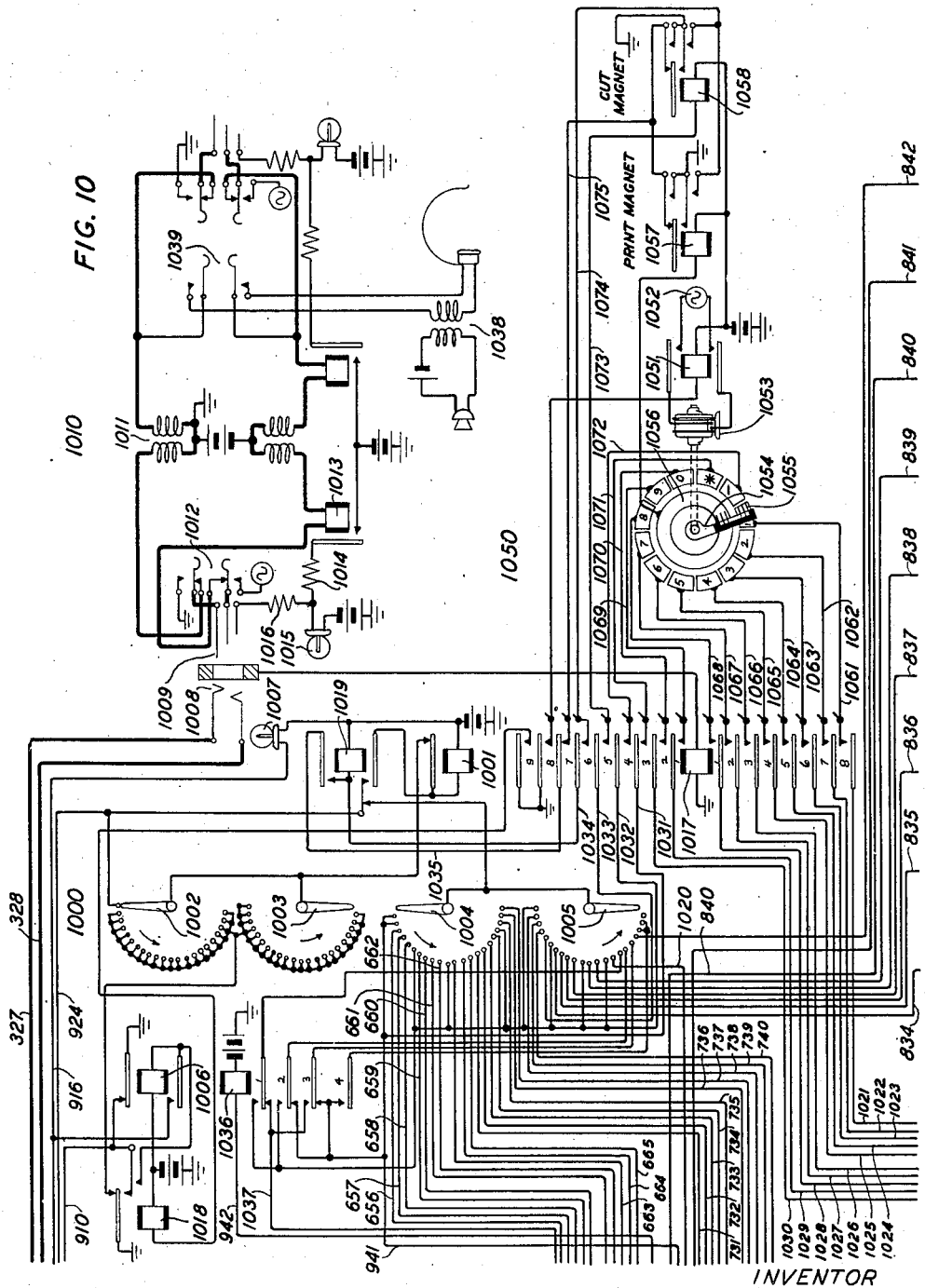

Patented Mar. 6, 1945

2,370,712

UNITED STATES PATENT OFFICE 2,370,712

AUTOMATIC TOLL TICKETING SYSTEM

Aloysius J. Busch, Madison, N. J., assignor to Bell Telephone Laboratories, Incorporated, New York, N. Y., a corporation of New York Application January 27, 1943, Serial No. 473,689

7 Claims. (Cl. 179—7.1)

This invention relates to automatic ticketing systems and more particularly to a system for supplying certain classes of subscribers with toll charge data for completed toll calls as soon as practicable after conversation has terminated on such calls.

As fully disclosed in the application of J. W. Gooderham, Serial No. 448,782, filed June 27, 1942, it has been proposed to enable subscribers to establish toll calls to nearby toll points by dialing. This is accomplished through the provision of a group of automatic ticketing trunks each having a toll ticket printer, which trunks are outgoing from an office and have access to all of the nearby toll offices to which subscribers are given access on a dialing basis. An idle one of these trunks may be seized for the extension of a connection in response to the dialing of one, two or three digits of the office designation of a wanted line terminating in an office of the nearby toll area and from which trunk a connection is extended by selector switch equipment. The selector switch equipment by which a connection is extended from a ticketing trunk is controlled by senders, an idle one of which is associated with the trunk by a trunk-finder individual to the sender when the trunk is taken for use. The sender is equipped with registers to register all of the digits of the wanted line number dialed by a calling subscriber, digits of the calling subscriber's number and other data required on a toll ticket and with apparatus for controlling the ticket printer of an associated trunk to print toll tickets. For reconstructing office code digits dialed by a calling subscriber, for securing the identification of the calling line, and for transferring this information to a sender seized to serve a call, a plurality of identifiers is provided an idle one of which is associated with a sender upon the seizure of the sender.

Since the trunk-finder does not afford sufficient control paths between an identifier and a calling trunk to enable information to be transmitted to the identifier from the trunk for reconstructing the called office code digits dialed by a calling subscriber, a plurality of identifier-trunk-connector circuits is provided for connecting the identifier taken for use directly with a calling one of the trunks. Also a plurality of sender-trunk-connector circuits is provided for connecting the sender taken for use directly with the calling one of the trunks for enabling the sender to control the ticket printer of the trunk in accordance with the registrations set up in the sender.

The toll tickets printed by the ticket printer of all of the trunks which relate to toll calls made by all subscribers of the office or office building which such trunks serve are periodically transmitted to the business office of the operating telephone company where they are used to prepare the monthly bills for telephone service for the several subscribers' accounts.

There are certain classes of subscribers who should receive the prepared toll tickets as soon as practicable following the completion of the calls for which the tickets have been printed. For example, if a hotel guest should make a toll call through the private branch exchange switchboard facilities of a hotel whose exchange lines extend to an office served by an automatic ticketing system of the type just described, it is desirable that information concerning the charge for such a call be secured by the private branch exchange attendant as soon as possible following the termination of the call in order that the charge may be placed upon the guest's hotel bill before he checks out. Since the automatic ticketing equipment as heretofore proposed does not enable the ticket information to be readily and speedily sent to an originating calling subscriber, it has been proposed to handle toll calls from such private branch exchanges on the usual manual basis, that is, by instructing such subscribers to originate toll calls by dialing the "A" operator at the central office who then serves and times the calls. At the termination of the conversation the private branch exchange attendant flashes the "A" operator and requests the elapsed time or charge for the call.

However, with automatic ticketing it is desirable to relieve the "A" operator of the work of dialing the called number and of timing the call by using the automatic ticketing facilities provided for this purpose. It is therefore the object of the present invention to so modify the automatic ticketing facilities that the private branch exchange attendant may obtain the necessary charge data without burdening the "A" operator with the unnecessary labor of dialing up the connection and then timing the conversational period.

In order to accomplish this each identifier is provided with additional class of service equipment for enabling it to determine if the calling line is one outgoing from a private branch exchange for which immediate charge information on a completed toll call is desired and each sender is also provided with an additional register relay operable from an associated identifier in response to the detection of a call of the private branch exchange class. The identifier is also arranged to transmit a signal to the ticketing trunk on such a private branch exchange call that the trunk should not time the call or print a ticket for it. Provision is, however, made for recording the data required for printing a ticket in a recorder at an "A" operator's position which is arranged to control a special ticket printer at the operator's position to print a toll ticket.

In the operation of the ticketing system as modified in accordance with the present invention, a toll ticketing trunk when seized on a call from a private branch exchange line proceeds, in the manner fully described in the Gooderham application hereinbefore referred to, to seize an idle sender over a trunk-finder, to associate such sender with an idle identifier over a sender-identifier-connector and to associate the identifier with the trunk over an identifier-trunk-connector. The sender then receives and registers the data concerning the wanted line as dialed by the calling private branch exchange attendant and as reconstructed by the identifier and the identifier proceeds to identify the calling line and the class thereof and to cause the registration of that data in the sender associated therewith. As soon as the complete data concerning the calling line has been registered in the sender, the sender proceeds to associate itself with the calling trunk over a sender-trunk-connector. Since the call is from a private branch exchange line the identifier informs the trunk that it need not time the call or print a ticket but prepares the trunk to enable the call to be timed by timing apparatus in a separate recorder circuit at an "A" operator's position. The sender also informs the sender-trunk-connector circuit, modified in accordance with the present invention, that it should transfer the ticket printer control conductors which it normally extends from the sender to the ticket printer of the calling trunk to a recorder at the "A" operator's position.

The sender also establishes a circuit over the sender-trunk-connector circuit to the trunk which is instrumental in starting a trunk-finder individual to an idle recorder to connect such recorder with the calling trunk whereby control circuits and a talking path is extended from the trunk to the recorder. When the trunk-finder has connected with the trunk a multi-contact relay in the sender-trunk-connector circuit, individual to the seized recorder and common to the subgroup of trunks in which the calling trunk is located, is operated to complete the extension of control conductors from the sender to the seized recorder. The sender then proceeds to transfer all data registered therein relating to the toll connection which has been completed under the control of the sender to the seized recorder where it is registered.

When the called subscriber answers, the timing apparatus of the seized recorder is started and proceeds to time the call until the call is terminated and to make a registration of the elapsed time. When the call is terminated a termination signal is transmitted to the recorder whereupon a calling lamp appearing on the "A" operator's switchboard position is lighted to indicate to her that data for a completed toll call has been recorded in the recorder to which the lighted lamp is individual. The operator then plugs the answering plug of one of her regular cord circuits into such jack whereupon the recorder becomes associated with a ticket printer at her position and proceeds to control such ticket printer to print data concerning the completed toll call on a toll ticket. As soon as the ticket is completed the "A" operator computes the charge or reads the elapsed time of conversation from the ticket and verbally gives the private branch exchange attendant the required information. Upon receiving the data the private branch exchange attendant disconnects, whereupon, the "A" operator disconnects and the connection established to the ticketing trunk is released. The recorder and position ticketer and control circuits also release.

As an alternative method of procedure the private branch exchange attendant may disconnect immediately upon the termination of the conversation, the connection to the ticketing trunk, however, being held under the control of the recorder. After computing the charge for the call the "A" operator may then originate a call to the private branch exchange to inform the attendant of the charge for the call.

For a clearer understanding of the invention reference may be had to the following detailed description taken in connection with the accompanying drawings in which:

Fig. 1 shows schematically a private branch exchange, a line-finder and selector switches by which a connection may be extended from a line outgoing from the exchange to an automatic ticketing trunk;

Fig. 2 discloses such portions of an automatic ticketing trunk as are essential to an understanding of the invention;

Fig. 3 shows a trunk-finder individual to a recorder for connecting such recorder to the trunk of Fig. 2;

Fig. 4 shows only such portions of a thousands number circuit, common number connector, identifier, identifier-trunk-connector, sender, sender-identifier-connector and sender-trunk-finder as are essential to an understanding of the invention;

Fig. 5 shows a sender-trunk-connector circuit modified in accordance with the invention;

Figure 7:
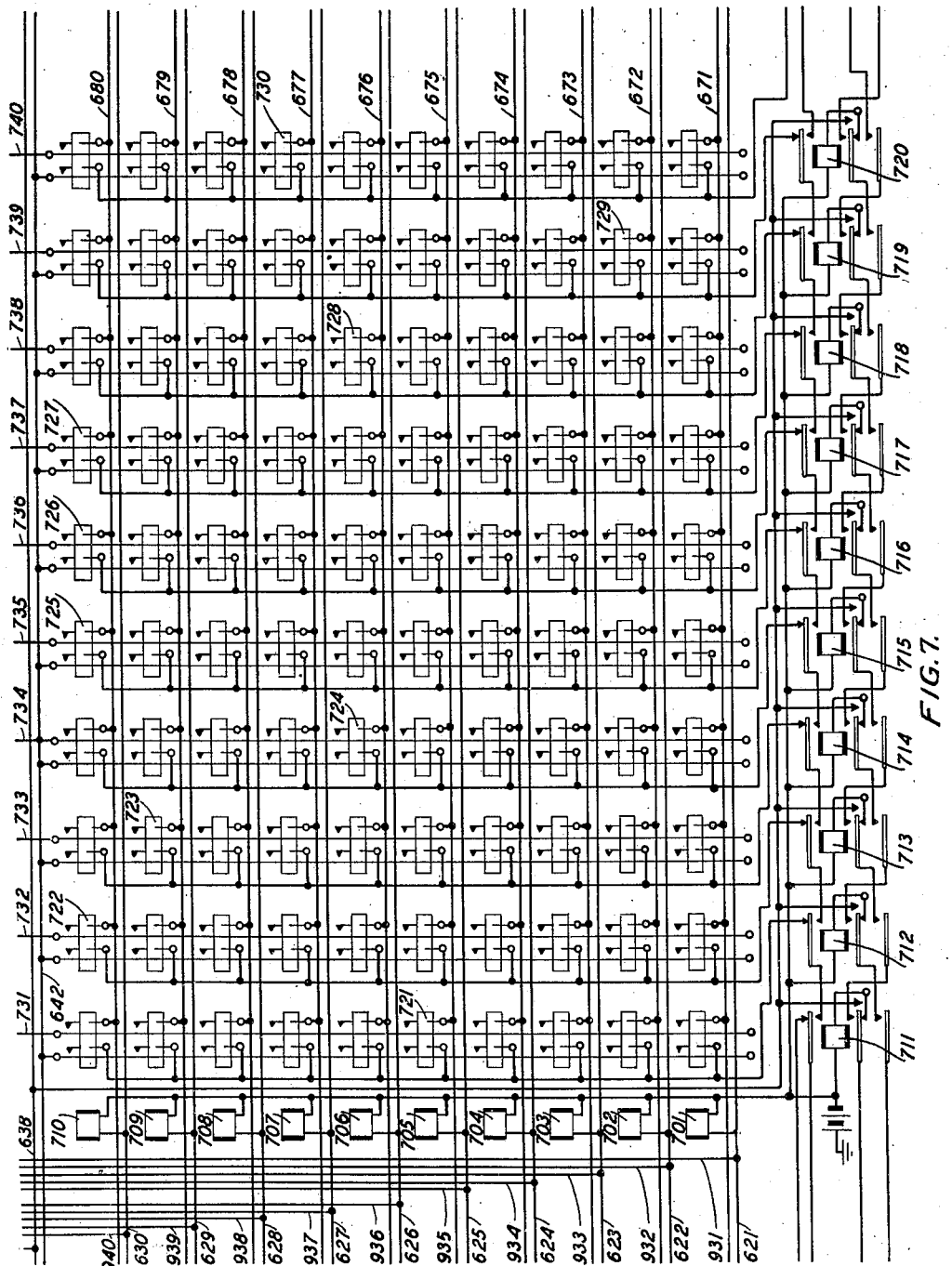
Figure 8:
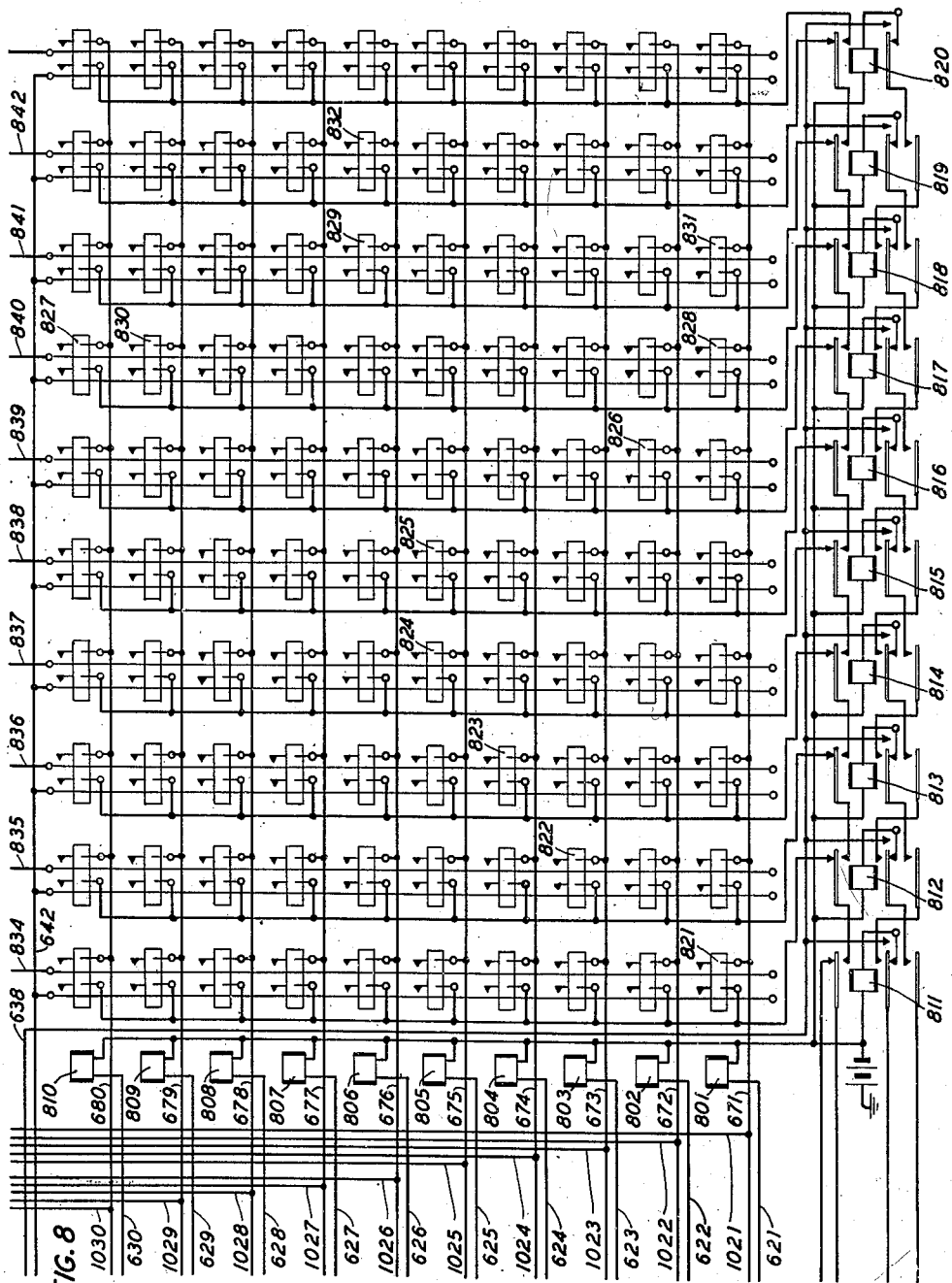
Figure 9:
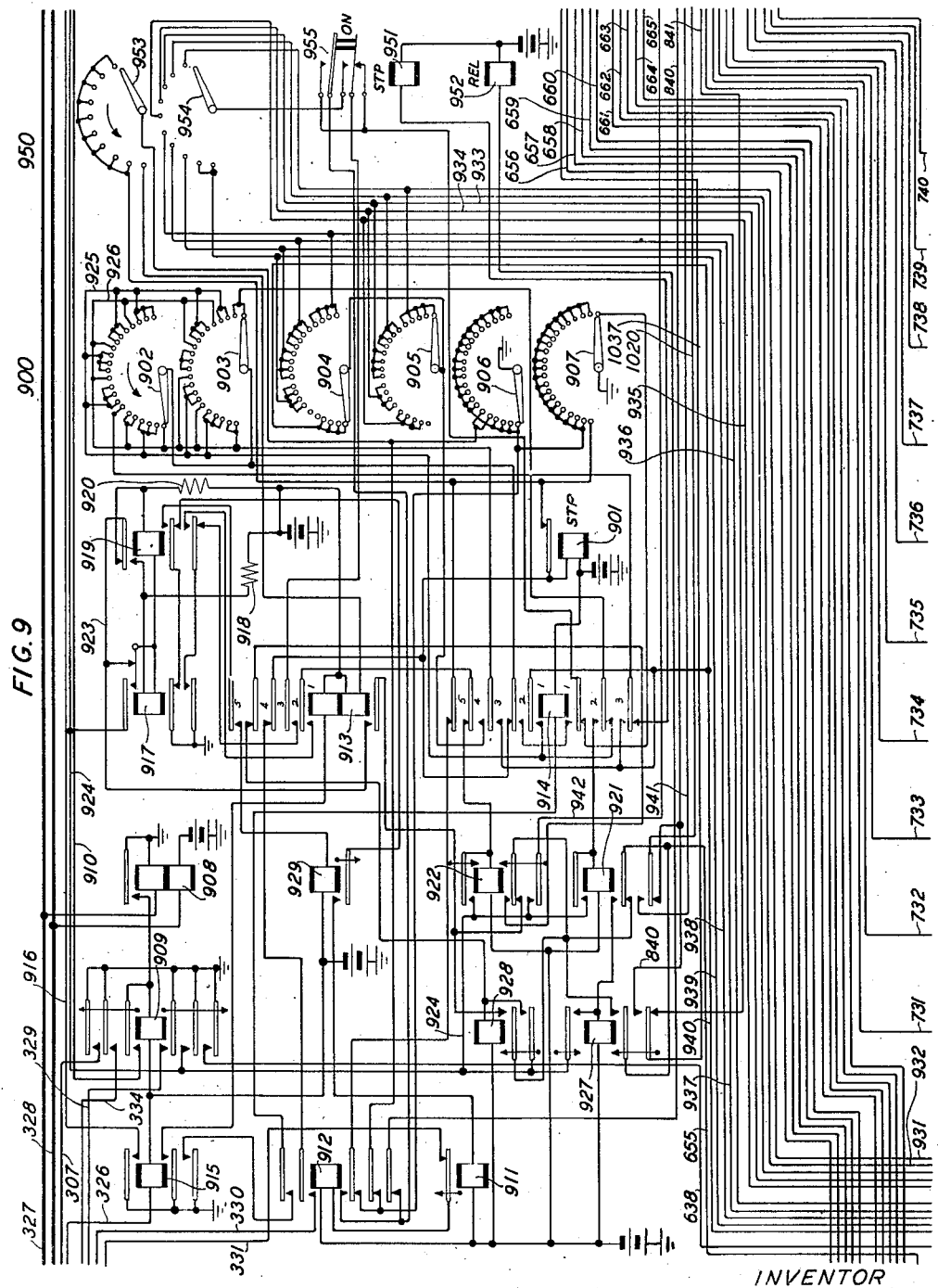

Figs. 6 to 10, inclusive, show the circuits of a recorder, Figs. 6, 7 and 8 showing cross bar registers for registering items of information concerning an established toll connection transferred thereto from the sender and from the elapsed time switches of the recorder, Fig. 9 showing the elapsed time switches which are set under the control of the associated trunk following the response of the called subscriber, and Fig. 10 showing the progress switch of the recorder. Fig. 10 also shows a cord circuit of an "A" operator's position and the ticket printer of such operator's position; and Fig. 11 is a diagram showing how the several figures of the drawings should be arranged to completely disclose the invention.

The line finder 101 and selector switches 102, 103, and 104 schematically disclosed in Fig. 1 are of the well-known step-by-step type, the selector switches being directly operable in response to dial impulses to establish either local connections within the local office or connections to toll ticketing trunks over which connections may be further extended to subscribers' lines terminating in offices of the nearby toll area. The sender-trunk-finder 400 of Fig. 4 is of the double brush step-by-step type more fully disclosed in Fig. 3.

The common number connector 414, the identifier-trunk-connector and the sender-identifierconnector of Fig. 4 are identical with the similar connectors disclosed in full in the Gooderham application hereinbefore referred to and the thousands number circuit 416, the identifier 402 and the sender 401 of Fig. 4 are substantially the same as the similar circuits of the Gooderham application except that provision is made in accordance with the present invention to identify an additional class of private branch exchange lines and to register such additional class first in the identifier and then in the sender at the time associated therewith by a sender-identifier-connector.

The ticketing trunk, portions of which are schematically disclosed in Fig. 2, is similar to the trunk fully disclosed in the Gooderham application except that the no-ticketing relay 207 thereof when operated on a signal from the identifier that no ticket for a particular call is to be printed by the ticket printer 208 of the trunk, as on a call of the private branch exchange class, transfers the timing control from the elapsed time switches of the trunk to a possible connection with the elapsed time switches of a recorder.

The sender-trunk-connector circuit of Fig. 5 is one of a plurality effective to associate a seized sender with a calling trunk. One of these circuits would be provided for each subgroup of ten ticketing trunks and that one of these circuits is taken for use as determined by the operation of the sender-trunk-finder 400 in associating a sender with the calling ticketing trunk. These connector circuits are in general similar to the corresponding circuits of the Gooderham application but have been modified in accordance with the present invention to control the starting of a recorder-trunk-finder, such as is shown in Fig. 3, if the private branch exchange register of the sender is operated to indicate that the call is of the private branch exchange class and to provide a transfer relay whereby the printer control conductors usually extended by the connector circuit to the printer of the trunk are transferred for extension to registers of a recorder.

The elapsed time register switch 900 of Fig. 9 for registering the units digit of the elapsed time of a toll call and the progress switch 1000 of Fig. 10 are of the rotary step-by-step type, the brushes of which are advanced step by step upon the release of their respective stepping magnets 901 and 1001. These switches are restored to normal by the intermittent operation of their stepping magnets to continue the forward rotation of their brushes. The elapsed time register switch 950 of Fig. 9 for registering the tens digit of the elapsed time of a toll call is of the rotary step-by-step type which is advanced step by step upon the release of its stepping magnet 951 and is restored by the operation of its release magnet 952. More particularly, the elapsed time switches 900 and 950 are similar to the corresponding switches disclosed in the trunk circuit of the Gooderham application and the progress switch 1000 is similar to the progress switch of the sender disclosed in that application.

The ticket printer 1050 associated with the "A" operator's position is of the type disclosed in the U. S. Patent to W. J. Zenner, No. 2,309,688, granted Feb. 2, 1943.

The registers disclosed in Figs. 6, 7 and 8 are of the cross bar type each having one hundred sets of cross-point contacts arranged coordinately in ten vertical rows of ten sets each. A contact set in any vertical row is selectively operable by the conjoint operation of a horizontal bar under the control of a select magnet such as the magnet 601 of Fig. 6 and of a vertical bar under the control of a hold magnet such as the magnet 611. The hold magnet of the three register switches also serve as a progress switch so that in response to the repeated operation of the select magnets contact sets in successive vertical rows of the registers are operated.

To enable a clearer understanding of the invention and the mode of its operation the manner in which a toll ticket is prepared on a toll call originating in a private branch exchange will now be described. It will be assumed that the private branch exchange indicated by the box 100 of Fig. 1 serves a hotel and that a guest at the hotel desires to secure a connection with a subscriber's line whose directory number is assumed to be MAR-1345. The attendant at the private branch exchange, to serve this call, causes a connection to be established with the line 105 outgoing from the private branch exchange switchboard and terminating in the bank of a line-finder such as 101. The line-finder is thereupon started to find such calling line and upon making connection therewith the usual dial tone is transmitted to the private branch exchange to inform the attendant that she may proceed to dial the digits of the subscriber's line number with whom the guest desires a connection. It will be assumed that in response to the dialing of the office code letter M the selector switch 102 is operated to select an idle ticketing trunk 106, portions of which are disclosed in Fig. 2.

Upon its seizure the line relay (not shown) of the trunk is operated and causes the starting of the sender-trunk-finder associated with an idle sender to hunt for and connect with the seized trunk 106. It will be assumed that the trunk-finder 400, the brushes only of which are disclosed in Fig. 4, and which switch is associated with the sender, portions of which are illustrated within the dot-dash rectangle 401 of Fig. 4, makes connection with the trunk 106. Also upon the seizure of the trunk, the sleeve relay 200 thereof, which is individualized to the terminal bank appearance of the trunk in the sixth level of the first selector 102, is operated in a circuit which may be traced in part from ground applied over the test or sleeve brush of selector 102, over the sleeve conductor 201 of the trunk 106, over the upper normal contacts and through the upper winding of relay 200, through the winding of relay 202 to battery and in parallel with the winding of relay 202, over the back contact of relay 202 and through resistance 203 to battery. Relay 200, upon operating, locks from battery through its lower winding and over its upper contacts to ground connected to conductor 204 through the operation of relay 205, which latter relay operated following the seizure of the trunk 106 and the operation of the line relay of such trunk. The locking ground for relay 200 is also connected over its lower contacts to sleeve conductor 201 of the trunk 106 for holding the operated line finder 101 and selector switch 102 from releasing. The sleeve relay 200 also prepares a circuit over its inner lower contacts over which the identifier is given information concerning the digit values of the code letters dialed to extend a connection to the trunk 106.

Following the seizure of the trunk 106, the next digit dialed by the private branch exchange attendant is registered in a digit register (not shown) but forming a part of the trunk. In the case assumed, the digit thus registered is the second code letter "A" having a numerical value of 2. In the meantime the sender 401 has become connected to the trunk by the trunk-finder 400 and the remaining digits of the wanted line number, that is, the third code letter R, having a digit value of 7, the thousands digit 1, the hundreds digit 3, the tens digit 4 and the units digit 5, become registered in dial pulse registers of the sender. As soon as one digit has been registered in the sender 401 it causes the connection of the sender to an available calling line identifier over contacts of a sender-identifier-connector. It will be assumed that the identifier, a portion of which is disclosed within the dot-dash rectangle 402, is taken for use and is connected to the sender 401 over contacts of the multicontact relay 403 constituting a portion of the sender-identifier-connector. Upon its seizure the identifier becomes connected to the ticketing trunk 106 serving the assumed toll call over contacts of the multicontact relay 404 forming a part of the identifier-trunk-connector circuit which serves the subgroup of twenty trunks in which the trunk 106 is located and as determined through the setting of the sender-trunk-finder 400.

With the sender connected to the trunk over the brushes of the trunk-finder 400 and the preference relay (not shown) of the identifier-trunk-connector which is individual to the identifier 402 operated, the circuit of the identifier-connector relay 206 of the trunk is completed and such relay operates. With relay 206 of the trunk and multicontact relay 404 of the identifier-trunk-connector both operated control circuits are established from the trunk to the identifier. Over one of these circuits battery is applied from the identifier over a conductor of cable 406, contacts of relay 404, conductor 408 of cable 407, the upper No. 4, contacts of relay 206, the inner lower contacts of sleeve relay 200, conductor 409 of cable 407, contacts of relay 404 and over a conductor of cable 406 to the identifier over which circuit the identifier is given information with respect to the office code letter which was dialed to seize the trunk 106, in the case assumed that the single office code letter M was dialed. Over another of the circuits, battery is applied from the identifier over another conductor of cable 406, contacts of relay 404, conductor 410 of cable 407, the upper No. 3 contacts of relay 206, thence over the brush and a bank terminal of the digit register of the trunk (not shown), assumed to have been set to register the second code letter A, thence back over a conductor of cable 407, contacts of relay 404, and a conductor of cable 406, to a register relay in the identifier 402 whereby the second code letter A, having the numerical value of 2, registered in the trunk register, is transferred to the identifier. The setting of the first dial pulse register of the sender 401 in which the third code letter R was registered, is also transferred over circuits established between the sender and the identifier over contacts of relay 403 of the sender-identifier-connector to set a register in the identifier. The identifier now having all of the data which it requires to reconstruct all of the office code letters of a wanted line number dialed by the private branch exchange attendant, proceeds to reconstruct such office code letters in digital form and to set registers in the sender 401 to register such digits. In the case assumed certain of the called line number registers of the sender are set from the identifier to register the called office code digits 6, 2 and 7, the remaining numerical digits of the wanted line number being registered in the dial pulse registers of the sender.

When the identifier was seized, it also established a circuit from the 270-cycle source of alternating current 411, over contacts of multicontact relay 404 of the identifier-trunk-connector, conductor 412, the upper No. 1 alternate contacts of identifier-connector relay 206 of the trunk 106, over the upper and lower contacts of sleeve relay 200, sleeve conductor 201, and thence over the connection established over brushes of selector 102 and line finder 101 to the sleeve conductor 108 of the private branch exchange line 105 to mark this line as calling with respect to the identifier 402. The identifier then proceeds over contacts of a tip or ring field relay 413 of the common number connector 414, and back contacts of relay 415 of the thousands number circuit 416 to test for the presence of the identification tone current on the sleeves of lines terminating in the thousands coils 417 of the thousands number circuit of all office units located in the same office building and to make registrations of the office unit and thousands group in which the calling line 105 is found. In accordance with the thousands group registration the thousands group connector relay 418 in the thousands number circuit 416 in which the sleeve conductor branch 109 of the calling line appears, is operated whereupon the identifier proceeds over contacts of relay 419 of the common number circuit 414, and contacts of relay 418 of the thousands number circuit 416, to test for the presence of identification tone current on the sleeves of lines terminating in different hundreds coils 420 of the selected thousands number circuit and to make a registration of the hundreds group in which the sleeve conductor branch 109 of the calling line appears. When the hundreds group registration has been made the identifier operates the corresponding hundreds group relay 421 of the thousands number circuit and then proceeds over circuits established over its contacts and contacts of relay 418 to test for the identification tone current on the sleeve conductor branch 109 of the calling line to determine the tens group of the selected group and the line terminal position therein and to make registrations thereof. The identifier thus identifies the office unit and the connector terminal number of the calling line.

At the same time that the identifier is determining the identity of the calling line it is also functioning to determine the class of such line. All central office lines which serve private branch exchanges, such as the line 105, each has the branch of its sleeve conductor, such as the branch 109, connected through a condenser-resistance network comprising a condenser 422 and resistance 423 to a contact of the hundreds connector relay which serves the hundreds group in which such line is located and is thus extended upon the operation of the hundreds group relay, for example relay 421, over contacts of the class connector relay 424 of the common number circuit, through the filter 425 and the primary winding of the input transformer 426 of the amplifier detector circuit 427, and through the filter 425 to ground. The tone current applied to the sleeve conductor 108 of the private branch exchange line from the source 411 at the identifier is thus impressed upon the input circuit of the amplifier tube 428, is amplified by such tube and impressed upon the input circuit of the detector tube 429 which responds and causes the operation of the anode relay 430. Relay 430 upon operating in turn operates relay 431 to register the fact that the call originated on a line of the private branch exchange class.

Relay 431 upon operating establishes a circuit from ground over its upper contacts, contacts of relay 404 of the identifier-trunk-connector, conductor 432, the No. 5 upper contacts of the identifier-connector relay 206 of the trunk 106, to battery through the lower winding of the no-ticketing relay 207 which operates and locks over its upper front contact to ground over the inner upper contacts of relay 205. The operation of relay 207 informs the trunk that no ticket for the call is to be printed by the ticket printer 208 of the trunk and that the elapsed time registering switches of the trunk need not therefore be set following the response of the called subscriber.

Relay 431 also establishes a circuit from ground over its lower contacts and contacts of relay 403 of the sender-identifier-connector to battery through the winding of the private branch exchange class relay 433 of the sender 401, which relay operates and locks over its inner lower contacts to the off-normal ground bus bar of the sender. As soon as all of the calling line identification digits have been registered in the identifier 402, such registrations are transferred over circuits extending over contacts of relay 403 of the sender-identifier-connector to an office unit and numerical digit registers in the sender 401 to register in the sender the identification digits of the calling private branch exchange line. As soon as all of the registrations have been transferred to the sender, the sender-identifier-connector relay 403 is released whereupon the identifier 402, common number connector 414, thousands number circuit 416 and identifier-trunk-connector are released. Relay 434 of the sender is also operated to initiate the operation of one of the sender-trunk-connectors to establish additional control paths from the sender to the calling ticketing trunk.

It will be assumed that, as determined by the setting assumed by the sender-trunk-finder 400 in connecting the sender 401 to the trunk 106, access to the subgroup of ten trunks in which the trunk 106 is located may be secured through the sender-trunk-connector circuit of Fig. 5, there being ten of such circuits if there are one hundred ticketing trunks. Therefore, when relay 434 operates, a circuit is established from battery over its upper contacts, the upper brush of the sender-trunk-finder 400, over the lower contacts of relay 434, conductor 435, through the winding of preference relay 500F of the sender-trunk-connector circuit appertaining to the subgroup of ten trunks in which the trunk 106 is located and which relay is individual to the first sender 401, to ground over the inner upper normal contacts of preference relays of such connector circuit individual to other senders, such as relay 500L individual to the last sender, if the sender-trunk-connector circuit is not being used by another sender. Relay 500F, upon operating, locks over its inner upper alternate contacts to ground, establishes a circuit from battery through resistance 501, over its inner lower front contact, to ground through the winding of multicontact relay 502F, and establishes a circuit from battery through resistance 503 over its middle upper front contact, conductor 436, brush 437 of the sender-trunk-finder 400, conductor 438, through the winding of multicontact relay 505 allocated to the calling trunk 106, over conductor 209 to ground at the back contact of tip party relay 210 of the trunk. With multicontact relays 502F and 505 both operated a plurality of circuit paths are prepared between the sender 401 and the trunk 106 which are ordinarily employed on a call for which the ticket printer 208 of the trunk is to print a ticket to control the operation of the ticket printer in accordance with toll data registered in the sender. The operations of the circuits thus far described are brought about in the manner fully described in the application of Gooderham hereinbefore referred to with the exception of the operations just described incident to the operation of the private branch exchange class register relay 431 of the identifier.

Since the call under consideration is assumed to be from a private branch exchange line and private branch exchange class register relay 433 of the sender has therefore been operated, then with multicontact relay 502F operated, a circuit is established for transfer relay 506 of the sender-trunk-connector circuit, extending from battery through its winding over the No. 1 contacts of relay 502F, conductor 439, over the inner lower front contacts of relay 433 to the locking ground of relay 433. Relay 506 thereupon operates and transfers the control conductors which have been extended from the sender over the Nos. 3 to 17 contacts of relay 502F, from their connection over contacts of relay 505 to the ticket printer 208 of the trunk 106, to the multipled contacts of the recorder connecting relays 507F to 507L. A start circuit is also established to start a trunk-finder individual to an idle recorder.

It will be assumed that the recorder-trunk-finder 300 of Fig. 3 which is the first choice preference for the subgroup of trunks in which the calling trunk is located and which subgroup of trunks is served by the sender-trunk-connector of Fig. 5 is idle. A circuit is therefore established from ground over the back contact of relay 440 of the sender, over the upper front contact of relay 433, conductor 441, the No. 20 contacts of relay 502F, the No. 28 contacts of relay 505 and conductor 508 to battery through the winding of trunk group relay 301. Relay 301 upon operating establishes a circuit from ground over the upper back contact of relay 302, the upper contacts of relay 301, over in-start conductor 303, over the middle normally closed contacts of the test and busy jack 304 of the trunk finder 300, the inner upper normal contacts of relay 305, through the winding of start relay 306 to battery and ground. Relay 306 upon operating connects ground over its inner upper front contact to conductor 307 and causes the operation of the stepping relay 308 in a circuit extending from ground over its lower front contacts, interrupter contacts of vertical magnet 309, interrupter contacts of rotary magnet 310, lower winding of relay 308 to battery and ground over the inner lower back contact of relay 305. Relay 308 upon operating causes the operation of the vertical stepping magnet 309 over a circuit extending from ground over the lower contacts of relay 306, over the contacts of relay 308, the upper back contact of relay 311, through the winding of magnet 309 and to battery over the inner lower back contact of relay 305. The brush shaft of the finder is thereby lifted one step, placing the commutator brush 312 on the first wired segment of the vertical commutator 313. The vertical off-normal springs 314 are now operated to their alternate positions and the circuit of relay 308 is opened at the interrupter contacts of magnet 309. Relay 308 now releases in turn releasing magnet 309 which in turn recloses the circuit of relay 308, relay 308 then reoperating and causing the reoperation of magnet 309. In this manner magnet 309 is repeatedly operated and released to advance the brushes upwardly step by step until the commutator brush 312 engages the segment 315 to which ground has been connected through the operation of the trunk group relay 301, whereupon a circuit is established from ground on such segment over brush 312, through the lower winding of relay 311, over the interrupter contacts of rotary magnet 310, through the lower winding of relay 308 to battery and ground over the inner lower back contact of relay 305. Relay 308 is thus held operated to prevent further stepping and relay 311, which is slow to operate, operates after an interval sufficient to permit the switch brushes to cease vibrating following the completion of their last vertical stepping movement and before they are started on their rotary stepping movement.

When relay 311 operates it locks in a circuit from battery over the inner lower back contact of relay 305, through the winding of magnet 309, through the upper winding and inner upper front contact of relay 311 to ground at the lower contacts of relay 306; opens at its inner lower back contact the circuit extending over the lower contacts of the off-normal springs 314 through the winding of release magnet 316 and transfers the stepping circuit control of stepping relay 308 from the vertical magnet 309 to the rotary magnet 310. With stepping relay 308 now operated the circuit of the rotary magnet 310 may be traced from ground over the lower contacts of relay 306, contacts of relay 308, upper front contact of relay 311 through the winding of magnet 310 to battery and ground. Magnet 310 upon operating advances the brush sets of the finder 300 one step in a rotary direction and opens at its interrupter contacts the holding circuit for relay 308 previously traced and the operating circuit thereof extending from ground over the lower contacts of relay 306, the interrupter contacts of magnet 309, the interrupter contacts of magnet 310, the lower winding of relay 308, to battery over the inner lower back contact of relay 305, whereupon relay 308 releases in turn releasing magnet 310. Magnet 310 upon releasing reestablishes the operating circuit of relay 308 which in turn reestablishes the circuit of magnet 310 to advance the brush set another step in a rotary direction. In this manner the brush sets are advanced step by step until the test brush 317 encounters the test terminal 318 of the calling trunk.

It has been assumed that the calling trunk of Fig. 2 appears in the last terminal set of the bank levels of the trunk finder 300 corresponding to the commutator segment 315, which levels are partly shown, and therefore when the brush sets have been stepped vertically to a position opposite such levels in the banks as illustrated and have been advanced ten steps in the rotary direction into engagement with the last terminal sets of such levels, a circuit will be established from battery through the winding of relay 440 of the sender, over the inner upper front contact of relay 433 of the sender, conductor 442, the No. 19 contacts of relay 502F, the No. 27 contacts of relay 505, conductor 509, to the test terminal 318, thence over test brush 317, through the lower winding of relay 319, the upper back contact of relay 305, through the upper winding of relay 308 to ground on conductor 307. Relay 308 is held operated over this circuit to prevent further rotary stepping of the switch brushes and relay 319 operates sufficiently to close its inner upper contacts thereby establishing a circuit from battery through its upper winding and over such contacts, over the lower contacts of rotary magnet 310 and contacts of relay 308 to ground over the lower contacts of relay 306. Both of its windings being now energized, relay 319 fully operates to extend control conductors 211 to 216, inclusive, of the trunk, over brushes 320 to 325, inclusive, of the trunk finder 300 and the contacts of relay 319 to conductors 326 to 331, inclusive, extending to the recorder shown in Figs. 6 to 10, inclusive; to cause the operation of relay 305 in a circuit extending from ground over the off-normal springs 314, the No. 3 upper front contact of relay 319, through the lower winding of relay 305 to battery and ground; to open at its upper No. 3 back contact another point in the circuit of release magnet 316 and to prepare a locking circuit for itself over its upper No. 1 front contact which will be effective following the operation of relay 305.

Relay 305 upon operating extends a connection from conductor 509, over bank terminal 318 and brush 317, the upper No. 2 contacts of relay 319 and the upper front contact of relay 305 to conductor 307 extending to the recorder; completes the locking circuit of relay 319 extending from battery through the upper winding and No. 1 upper contacts of such relay, over the lower front contacts of relay 305 to ground on conductor 307; opens the circuit through the lower winding of relay 319 to the test brush 317; transfers at its inner upper contacts the in-start conductor 303 from the winding of the start relay 306 to the out-start conductor 332 and through the upper winding of relay 305 to battery at the upper back contact of relay 333; at its inner lower back contact removes battery from the windings of relays 308 and 311 and from the vertical magnet 309 and at its upper front contact shunts the upper winding of relay 308. Relays 308 and 311 now release and relay 306 being slow to release releases after an interval sufficient to allow ground to be applied to conductor 307 at the recorder to hold relay 319 and relay 440 of the sender operated. When relay 311 releases the continuity of the out-start conductor is established at its lower contacts whereby if a second trunk in the same subgroup should be in a calling condition ground placed on the in-start conductor 303 will be effective to start the second trunk-finder of the same subgroup of finders if it is idle, over a circuit extending from conductor 303 over the middle normal contacts of test jack 304, the inner upper front contacts of relay 305, the lower normal contacts of relay 311, conductor 332, the lower normal contacts of test jack 304, the middle normal contacts of test jack 304' associated with the second trunk-finder of the same trunk-finder group and over the inner upper normal contacts of relay 305' to the start relay of such finder corresponding to relay 306. When relay 440 of the sender operated as previously described, it opened the previously traced circuit for group relay 301 and that relay releases if no other trunk of the same subgroup is at the time seeking connection with a recorder.

With relay 319 of the recorder-trunk-finder 300 operated a circuit is now established from ground through the upper winding of relay 908, conductor 327, the No. 5 upper contacts of relay 319, brush 321 of the trunk-finder, conductor 212, thence over the tip conductor of the connection established over tip brushes of the selector 102 and line-finder 101 to the private branch exchange 100 and returning over ring brushes of the line-finder and selector, ring conductor 213, brush 322 of the trunk finder, the No. 4 upper contacts of relay 319 and conductor 328 to battery through the lower winding of relay 908. Relay 908 operates and closes an obvious circuit for slow-to-release relay 909 which operates, locks over its inner upper contacts and conductor 910 to ground over the back contact of relay 1006; connects ground over its upper contacts to conductor 307 to hold the operated relays of the trunk-finder 300 and relay 440 of the sender; supplies off-normal ground for apparatus of the recorder; connects ground over its inner lower contacts to conductor 329, thence over the lower No. 3 contacts of relay 319, brush 323 and conductor 214 to conductor 204 for providing holding ground for the operated selector switch 102 and the line-finder 101, and over its upper middle contacts establishes a circuit from ground over conductor 334, the No. 2 lower contacts of relay 319, brush 335, conductor 218, over the No. 1 contacts of relay 505 of the sender-trunk-connector circuit to battery through the winding of relay 507F. Relay 507F thereupon operates to complete the extension of control conductors from the sender to the recorder which has been connected to the trunk by the recorder-trunk-finder 300. With relay 507F operated, a circuit is established from ground over its No. 1 contacts, the No. 1 contacts of transfer relay 506, the No. 2 contacts of relay 502F, conductor 443 and through the lower contacts of the private branch exchange register relay 433 of the sender to advance the progress switch of the sender to its first control position for transferring the first item of information concerning the established toll connection which has been registered in the sender to the recorder.

It will be assumed that the sender has registered the following data: calling office code digits 283; calling line numerical digits 9095; sender No. 00; identifier No. 0; called office code digits 627; called line numerical digits 1345; digit 5 indicative of the class of the calling line and digit 2 indicative of the charge rate for the initial period of conversation and that the month, day and hour circuit which becomes associated with the sender has registered the date and time when the call was made as 9.36 o'clock on December 25 as indicated by the digital settings of its registers 1225096. The progress switch of the sender therefore proceeds to control the registration of digits in the selected recorder in accordance with this registered information. The progress switch of the sender as fully disclosed in the Gooderham application is arranged to first control a ticket printer to print two asterisks on a toll ticket to indicate the beginning of a new ticket and to conrol the printing of dashes on the ticket to separate the several items of information as for example following the three digits of the calling office code. It is not, however, necessary to register the asterisk or dash characters in registers of the recorder under the control of the progress switch of the sender since the control of the printing of these characters at the proper points during the printing of a toll ticket by the position ticket printer 1050 may be readily exercised by the progress switch 1000 of the recorder as will later appear.

With the progress switch of the sender advanced to its first control position as previously described, ground is connected by the progress switch to control conductor 444 over the No. 17 contacts of relay 502F, the No. 16 front contacts of relay 506, the No. 16 contacts of relay 507F, conductor 631 to battery through the winding of relay 632. Relay 632 thereupon operates and connects ground to conductors 633 and 634 whereupon a first circuit is established from ground on conductor 633 over the No. 12 contacts of relay 507F, the No. 12 front contact of relay 506, the No. 13 contacts of relay 502F and conductor 445 to battery through the stepping relay of the sender progress switch, and a second circuit is established from ground on conductor 634 over the No. 13 contacts of relay 507F, the No. 13 front contact of relay 506, the No. 14 contacts of relay 502F, and conductor 446 to the locking contacts of the stepping relay. The stepping relay of the progress switch of the sender is thus controlled to cause the advance of the brushes of such switch to their next control position and to open the circuit of relay 632 of the recorder in the manner fully disclosed in the Gooderham application above referred to. With the brushes of the progress switch in their next control position, relay 632 of the recorder is again operated and under its control the progress switch is again advanced another step to a position for controlling the registration of the first calling office code digit.

It has been assumed that the first digit of the calling office code as registered in the sender is 2. Therefore, a circuit is established from ground over a brush of the progress switch and under the control of the office unit register of the sender to control conductor 452, over the No. 4 contacts of relay 502F, the No. 3 front contact of relay 506, the No. 3 contacts of relay 507F, conductor 622, through the winding of the No. 2 select magnets 602, 702 and 802 in parallel to battery. These magnets are energized to rotate their associated select bars and magnet 602 upon operating also extends its operating ground over its contacts, conductor 635, over the left normal contacts and through the winding of relay 636, and through resistance 637 to battery. Relay 636 thereupon operates and locks over its left alternate contacts and conductor 638 to ground over the lower contacts of relay 909. A circuit is also established in parallel with the winding of relay 636, through the winding of relay 639 and resistance 640 to battery, but the winding of relay 639 being shunted over its left back contact so long as ground is maintained connected to conductor 635 from the sender, relay 639 does not operate. With relay 636 operated and relay 639 not operated, a circuit is established from ground over the right front contact of relay 636, the right back contact of relay 639, over the inner lower normal contacts and through the winding of the first hold magnet 611 of the register of Fig. 6 to battery. Hold magnet 611 thereupon operates, locks over its inner lower alternate contacts to ground on conductor 638, rotates the first vertical hold bar which in conjunction with the select bar operated by select magnet 602 operates the cross-point contact set 641, and establishes a circuit from ground applied from the sender over contacts of magnet 602 over the upper front contact of magnet 611, the upper back contact of magnet 612, the left contacts of the operated cross-point contact set 641, conductor 642, through the winding of relay 643 to battery. Relay 643 thereupon operates and at its right contacts connects ground to conductors 633 and 634 for controlling the advance of the progress switch of the sender. When the progress switch advances preparatory to controlling the transfer of the registration of the next calling office code digit, ground is removed from control conductor 622 whereupon magnets 602, 702 and 802 release and ground is removed from conductor 635 whereupon relay 639 operates in a circuit from ground on conductor 638, over the left alternate contacts of relay 636, through the winding of relay 639 and resistance 640 to battery. With magnet 602 now released, the operated cross-point contact set 641 is held in its operated position by the hold magnet 611. The removal of ground from conductor 622 also releases relay 643.

It has been assumed that the second digit of the calling office code as registered in the sender is 8. Therefore, a circuit is now established from ground over a brush of the sender progress switch and under the control of the office unit register of the sender to control conductor 458, over the No. 10 contacts of relay 502F, the No. 9 front contact of relay 506, the No. 9 contacts of relay 507F, conductor 628 through the windings of the No. 8 select magnets 607, 708 and 808 in parallel to battery. These magnets all energize to rotate their associated select bars and magnet 608 upon operating extends its operating ground over its contacts, conductor 635, over the left front contact of relay 639 to a point between the winding of relay 636 and resistance 637 whereupon relay 636 is shunted down and releases, relay 639 now being held operated from ground on conductor 635, over the left normal contacts of relay 636 and through its own winding and resistance 640 to battery. With relay 636 unoperated and relay 639 operated, a circuit is now established from ground over the right back contact of relay 636, over the right front contact of relay 639, over the lower contacts of operated hold magnet 611, over the inner lower normal contacts and through the winding of hold magnet 612 to battery and ground. Hold magnet 612 thereupon operates, locks over its inner lower alternate contacts to ground on conductor 638, rotates the second vertical hold bar which, in conjunction with the select bar operated by select magnet 608 operates the cross-point contact set 644, and establishes a circuit from ground applied from the sender over contacts of magnet 608, over the upper front contacts of magnet 611 and 612, over the upper back contact of magnet 613, the left contacts of the operated cross-point contact set 644, through the winding of relay 643 to battery. Relay 643 thereupon operates and at its right contact connects ground to conductors 633 and 634 for controlling the advance of the sender progress switch. When the progress switch advances preparatory to controlling the transfer of the registration of the next calling office code digit, ground is removed from control conductor 628 whereupon magnets 608, 708 and 808 release and ground is removed from conductor 635 whereupon relay 639 releases. Magnet 608 upon releasing also opens the circuit of relay 643 which then releases. With magnet 608 now released the operated cross-point contact set 644 is held in its operated position by the hold magnet 612.

It has been assumed that the third digit of the calling office code as registered in the sender is 3. Therefore a circuit is now established from ground over a brush of the sender progress switch and under the control of the office unit register of the sender to control conductor 453, over the No. 5 contacts of relay 502F, the No. 4 front contact of relay 506, the No. 4 contacts of relay 507F, conductor 623, through the windings of the No. 3 select magnets 603, 703 and 803 in parallel to battery. These magnets all energize to rotate their associated select bars and magnet 603 upon operating extends its operating ground over its contacts, conductor 635, over the left normal contacts and through the winding of relay 636 and through resistance 637 to battery, whereupon relay 636 operates and locks in the manner previously described. With relay 636 operated and relay 639 unoperated, a circuit is now established from ground over the right front contact of relay 636, the right back contact of relay 639, the inner lower front contact of relay 611, the lower front contact of magnet 612, over the inner lower normal contacts and through the winding of hold magnet 613 to battery. Hold magnet 613 thereupon operates, locks over its inner lower alternate contacts to ground on conductor 638, rotates the third vertical hold bar which in conjunction with the select bar operated by select magnet 603 operates the cross-point contact set 645, and establishes a circuit from ground applied from the sender over contacts of magnet 603, over the upper front contacts of magnets 611, 612 and 613, over the upper back contact of magnet 614, the left contacts of the operated cross-point contact set 645, through the winding of relay 643 to battery. Relay 643 thereupon operates and at its right contacts connects ground to conductors 633 and 634 for controlling the advance of the sender progress switch. When the progress switch advances ground is removed from control conductor 623 whereupon magnets 603, 703 and 803 release and ground is removed from conductor 635 whereupon relay 639 operates in the manner previously described. Magnet 603 upon releasing also releases relay 643. With magnet 603 now released the operated cross-point contact set 645 is held in its operated position by the hold magnet 613.

The sender progress switch in the terminal position to which it has now been advanced would normally be instrumental in controlling the ticket printer of an associated trunk to print a dash on a toll ticket to separate the three calling office code digits previously printed on the ticket from the four numerical digits of the calling line number to be subsequently printed, but with the sender connected to the recorder the progress switch causes the connection of ground to control conductor 447, over the No. 16 contacts of relay 502F, the No. 15 front contact of relay 506, the No. 15 contacts of relay 507F, conductor 646, to battery through the winding of relay 632. Relay 632 thereupon operates and connects ground to conductors 633 and 634 for controlling the advance of the sender progress switch into a position for controlling the registration of the first numerical digit of the calling line number in the register circuit of the recorder. Upon the advance of the progress switch ground is removed from control conductor 646 whereupon relay 632 releases.

In the next four positions of the sender progress switch, assuming that the numerical digits of the calling line number registered in the sender are 9, 0, 9, 5, control conductors 629, 630, 629 and 625 are successively grounded to cause the successive operation of the select magnets 609, 610, 609 and 605 and the successive operation of the hold magnets 614, 615, 616 and 617 under the control of relays 636 and 639 in the manner previously described, whereby the cross-point contact sets 647, 648, 649 and 650 are operated to register the thousands digit 9, the hundreds digit 0, the tens digit 9 and the units digit 5 of the calling line number.

Following the registration of the units digit of the calling line number the sender progress switch is advanced into its next terminal position in which position it would normally control the ticket printer of an associated trunk to print a dash to separate the calling line numerical digits printed on the ticket from the digits of the date and time of day to be subsequenly printed. But with the sender associated with the recorder, the progress switch connects ground to control conductor 646 for operating relay 632, which, upon operating, connects ground to conductors 633 and 634 for controlling the advance of the sender progress switch into a position for controlling the association of an available month, day and hour circuit with the sender, as fully set forth in the Gooderham application hereinbefore referred to. Thereupon the progress switch is advanced into its next terminal position preparatory to controlling the registration in the recorder of the first digit of the month as secured from the month, day and hour circuit. In this position and the next six positions, assuming that the digits of the month are 1 and 2 to indicate the month to be December, the digits of the day of the month to be 2 and 5 to indicate the 25th day of the month, the digits of the hour of the day to be 0 and 9 to indicate the ninth hour of the day and the digit of the fractional part of the hour to be 6 to indicate thirty-six minutes past the hour, control conductors 621, 622, 622, 625, 630, 629 and 626 are successively grounded by the progress switch to cause the successive operation of the select magnets 601, 602, 602, 705, 710, 709 and 706 and the successive operation of the hold magnets 618, 619, 620, 711, 712, 713 and 714 under the control of relays 636 and 639 in the manner previously described. Under the joint control of the operated select magnets and hold magnets, cross-point contact sets 651, 652, 653, 721, 722, 723 and 724 are operated.

Following the registration of the last digit of the time of day as secured from the month, day and hour circuit the sender progress switch is advanced into its next position in which position the connection between the sender and the month, day and hour circuit is released and the progress switch is then advanced into its next terminal position in which it would normally control the ticket printer of the associated trunk to print a dash to separate the digits of the date and time of day printed on the ticket from the sender and identifier number digits to be printed subsequently. But with the sender connected with the recorder the progress switch connects ground to control conductor 646 for operating relay 632 which, upon operating, connects ground to conductors 633 and 634 for controlling the advance of the sender progress switch into a position for controlling the registration in the recorder of the tens digit of the number of the sender used for establishing the connection. Upon the advance of the progress switch ground is removed from control conductor 646 whereupon relay 632 releases.

In the next three positions of the sender progress switch, assuming that the tens and units digits of the sender number are 0 and 0 and that the number of the identifier used is also 0, control conductor 630 is successively grounded three times to cause the successive operation of the select magnet 710 three times and the successive operation of the hold magnets 715, 716 and 717 under the control of relays 636 and 639 in the manner previously described whereby the cross-point contact sets 725, 726 and 727 are operated to register the sender and identifier number digits 0, 0 and 0.

Following the registration of the identifier number digit, the sender progress switch is advanced into its next terminal position in which position it would normally control the ticket printer of the associated trunk to print a dash to separate the digits of the sender and identifier numbers printed on the ticket from the digits of the called office code to be subsequently printed. But with the sender associated with the recorder the progress switch connects ground to control conductor 646 for operating relay 632 which, upon operating, connects ground to conductors 633 and 634 for controlling the advance of the sender progress switch into a position for controlling the registration of the first office code digit of the called line number. Upon the advance of the progress switch ground is removed from control conductor 646 whereupon relay 632 releases.

In the next three positions of the sender progress switch assuming that the called office code digits registered in the sender are 6, 2 and 7, control conductors 626, 622 and 627 are successively grounded to cause the successive operation of the select magnets 706, 702 and 707 and the successive operation of hold magnets 718, 719 and 720 under the control of relays 636 and 639 in the manner previously described whereby the cross-point contact sets 728, 729 and 730 are operated to register the called office code digits 6, 2 and 7.

Following the registration of the last called office code digit, the sender progress switch is advanced into its next terminal position in which position it would normally control the cut magnet of a trunk to sever from the ticket roll the ticket printed for the preceding call, but with the sender associated with the recorder the progress switch connects ground to conductor 448 thereby establishing a circuit from such conductor over the No. 15 contacts of relay 502F, the No. 14 front contact of relay 506, the No. 14 contacts of relay 507F, over conductor 654 to battery through the winding of relay 632. Relay 632 upon operating connects ground to conductors 633 and 634 for controlling the advance of the sender progress switch to its next terminal position whereupon relay 632 releases. In this position the progress switch normally controls the ticket printer of the associated trunk to print a dash to separate the printed called office code digits from the called number numerical digits to be subsequently printed. But with the sender associated with the recorder the progress switch connects ground to control conductor 646 for operating relay 632 which connects ground to conductors 633 and 634 for controlling the advance of the sender progress switch into a position for controlling the registration of the first numerical digit of the called line number whereupon relay 632 releases.

In the next four positions of the sender progress switch assuming that the called line numerical digits registered in the sender are 1, 3, 4 and 5, control conductors 621, 623, 624 and 625 are successively grounded to cause the successive operation of the select magnets 801, 803, 804 and 805 and the successive operation of hold magnets 811, 812, 813 and 814 under the control of relays 636 and 639 in the manner previously described whereby the cross-point contact sets 821, 822, 823 and 824 are operated to register the called line numerical digits 1, 3, 4 and 5.

Following the registration of the last called line numerical digit, the sender progress switch is advanced to its next terminal position in which it normally controls the ticket printer of the associated trunk to print a dash to separate the printed called line numerical digits from the class and rate digits to be printed subsequently. But since the sender is associated with the recorder, the progress switch connects ground to control conductor 646 for operating relay 632, which connects ground to conductors 633 and 634 for controlling the advance of the sender progress switch into a position for controlling the registration of a digit indicative of the class of the calling line whereupon relay 632 releases.

In the next two positions of the sender progress switch assuming that the class digit of the calling line registered in the sender is 5 and that the digit indicating the rate to be charged for the initial period of conversation for the call as registered in the sender is 2, control conductors 625 and 622 are successively grounded to cause the successive operation of select magnets 805 and 802 and the successive operation of hold magnets 815 and 816 under the control of relays 636 and 639 in the manner previously described whereby the cross-point contact sets 825 and 826 are operated to register the class digit 5 and the rate digit 2, respectively.

Following the complete registration of the digits of the called office code in the sender, the sender caused the establishment of an operating circuit or identifier-connector-relay 206 of the trunk to cause such three-position polarized relay to operate its lower contacts thereby establishing the circuit for cut-through relay 219. With relay 219 operated and relay 207 also operated a circuit is established from ground through the upper winding of supervisory relay 220, the upper No. 3 contacts of relay 207, over the lower back contact of reversing relay 221, through the upper left winding of repeating coil 222, over the upper contacts of relay 219, the tip conductor 223 of trunk 106, tip brushes of selector 102 and line-finder 101, through the private branch exchange 100, returning over the ring brushes of line-finder 101 and selector 102, ring conductor 224 of trunk 106, the lower contacts of relay 219, the lower left winding of repeating coil 222, the upper back contact of relay 221, the upper No. 2 contacts of relay 207 to battery through the lower winding of relay 220. Relay 220 thereupon operates and establishes a holding circuit for relay 205 extending from ground over the lower contacts of relay 205, over the contacts of relay 220 to battery through the winding of relay 205.

After the sender has completed the establishment of the connection to the wanted line and has transferred all of the data registered therein relating to the established toll connection, the sender, 401, sender-finder 400 and the sender-trunk-connector are all released in the manner fully set forth in the Gooderham application hereinbefore referred to.

When the called subscriber answers the direction of current flowing through the winding of polarized supervisory relay 225 is reversed whereupon relay 225 operates in turn establishing an obvious circuit for reversing relay 221. As soon following the operation of relay 221 as ground is applied over conductor 226 from the timing interrupter circuit, a circuit is completed over the inner lower normal contacts of relay 227, over the lower contacts of relay 221, over the inner lower contacts of relay 219 and through the lower winding of relay 227 to battery. Relay 227 thereupon operates, locking to the direct ground over its inner lower alternate contacts and connecting ground over its lower contacts and the upper back contact of relay 228 to conductor 229 extending to the timing interrupter circuit to start the measurement of a time interval. After a two seconds delay ground will be applied to conductor 230 at the timing interrupter circuit thereby completing a circuit over the upper contacts of relay 227 and over the inner upper normal contacts and through the winding of relay 228 to battery whereupon relay 228 operates and locks over its inner upper alternate contacts and the inner lower contacts of relay 207 to ground over the inner upper contacts of relay 205.

With relay 228 operated ground is connected over its upper contacts to conductor 216 for providing a locking circuit over the inner upper front contact and through the upper winding of relay 207 to hold such relay operated and to establish a circuit from conductor 216 over brush 325 of trunk-finder 300, over the lower No. 5 contacts of relay 319, conductor 331 and over the back contacts of slow-to-release relay 911 to battery through the winding of relay 912. Relay 912 thereupon operates and with relay 228 operated a timing pulse circuit is established from ground over a contact of relay 231, which is operated once every fifteen seconds by the clock operated timer 232, over the lower contacts of relay 228, the lower front contact of relay 207, conductor 215, brush 324 of trunk-finder 300, over the lower No. 4 contacts of relay 319, conductor 330, over the inner upper contacts of relay 912, over the upper No. 3 back contact of relay 913 to batttery through the winding of stepping magnet 901 of the units timing register 900 of the recorder. Thus at fifteen-second intervals the brushes of timing register 900 are advanced step by step. If the conversation continues until such timing register 900 advances its brushes 902, 904 and 906 to the No. 38 terminals of their associated arcs, a circuit will be closed from ground applied over the upper No. 3 back contact of relay 913 thence as traced through the winding of the stepping magnet 901 of register 900 and also over the upper No. 2 back contact of relay 914 over brush 902 and the No. 16 terminal of its arc, over the lower No. 3 back contact of relay 914 to battery through the winding of stepping magnet 951 of the tens timing register 950. The operation of magnet 951 will advance register 950 one terminal step thereby causing register 950 to advance one step for each revolution of register 900. In this manner register 900 is used as a measure of the units of conversation time, while register 950 measures the tens. The terminals 1, 39 and 40 of the arcs of the units register 900 are passed by when the tens register 950 has made one step or more until register 950 reaches its tenth step position. The units register 900 always passes by its No. 22 position terminal by the establishment of a circuit from ground on brush 907 over the No. 22 position terminal of its arc and over the interrupter contacts and through the winding of stepping magnet 901 to battery. The advance of registers 900 and 950 continues in this manner throughout the conversation until ninety-nine minutes have elapsed at which time, after registering the elapsed time in the register of Fig. 8 the registers are restored to normal and another cycle of ninety-nine minutes is begun and proceeds as above described.

At the end of the conversation the attendant at the private branch exchange flashes slowly in the usual manner whereupon the trunk 106 recognizes the flashing as a disconnect signal and relay 220 releases in turn releasing relay 205 whereupon relays 207 and 228 also release, relay 228 upon releasing opening the previously traced circuit for relay 912 in the recorder and the circuit over which timing impulses were transmitted from the timer 232 to the timing registers 900 and 950. Relay 205 upon releasing establishes a circuit which may be traced from ground over its back contact, conductor 211, brush 320 of trunk-finder 300, the lower No. 1 contacts of relay 319, conductor 326, to battery through the winding of relay 915. Relay 915 thereupon operates and establishes a circuit from ground over its upper contacts and conductor 916 through lamp 1007 to battery whereupon lamp 1007 which is associated with jack 1008 on an "A" operated switchboard lights to inform an operator at such switchboard that a toll call record has been set up on the recorder to which such lamp and jack are individual. Relay 915 also establishes a circuit over its inner lower contacts through the upper winding of relay 913 to battery and a circuit over its lower contacts and over the upper contacts of relay 912, through the winding of relay 914 to battery whereupon such relays operate. Relay 913 upon operating establishes a circuit for relay 917 which may be traced from ground over the back contact of relay 643, conductor 655, over the inner lower back contacts of relay 921, the lower back contacts of relay 922, the lower contacts of relay 913, conductor 923, over the upper normal contacts and through the winding of relay 917 and through resistance 918 to battery, and in parallel with the winding of relay 917 through the winding of relay 919 and resistance 920 to battery. Relay 917 operates but the winding of relay 919 being shunted over its upper back contact does not operate so long as ground remains applied to conductor 923. Relay 917 upon operating locks over its upper alternate contacts and conductor 924 to ground over the middle lower contacts of operated off-normal relay 909.

With relay 917 operated and relay 919 unoperated, a circuit is now established from ground over the lower front contact of relay 917, the lower back contact of relay 919, the upper No. 2 contacts of relay 913 to the lower movable spring of off-normal switch 955 associated with the tens timing register 950. If this register has not been advanced due to the call having been less than ten minutes in duration, the circuit is extended over the lower No. 1 front contact and the upper No. 2 front contact of relay 914 to brushes 902 and 903 of the units timing register 900. If this register has not advanced its brush 903 beyond the first two terminals of its arc indicating a maximum duration of conversation of not more than fifteen to thirty seconds, the circuit is further extended over the lower No. 2 front contact of relay 914 and through the winding of the (*) register relay 921 to battery. Relay 921 if operated, locks over its upper contacts to off-normal ground conductor 924 and at its inner lower back contact opens the previously traced circuit over which ground was applied to conductor 923 to thereby permit the operation of relay 919. Relay 921, upon operating, also establishes a circuit from ground on conductor 655, over its inner lower front contact and through the winding of relay 927 to battery, and relay 927 operates after an interval as determined by its slow-to-operate characteristic, locks over its upper contacts to ground on conductor 924 and reconnects ground applied to conductor 655 over the left back contact of relay 643, over its contacts, the lower back contact of relay 922, the lower contacts of relay 913, conductor 923 and over the upper front contact of relay 919 to a point between the winding of relay 917 and resistance 918, whereupon relay 917 is shunted and releases. Relay 919 is now maintained operated in a circuit from battery through resistance 920, through its winding and over the upper normal contacts of relay 917 to ground on conductor 923.

If, however, the units timing register 900 has advanced beyond the Nos. 1 and 2 terminals of the arc associated with brush 903, the previously traced circuit is extended over either brush 902 or brush 903 and a terminal of the associated arc to either conductor 925 or 926 and thence over the upper No. 1 or the upper No. 3 front contacts of relay 914 to conductor 940, thence over conductor 630 through the windings of the No. 0 select magnets 610, 710 and 810 in parallel to battery. If these magnets are thus operated, magnet 810 with hold magnet 816 previously operated upon the registration of the digit previously transmitted from the sender, causes the operation of hold magnet 817 over a circuit which may be traced from ground applied to conductor 630, over the contacts of magnet 610, to conductor 635 to operate relay 636, relay 639 remaining unoperated as previously described. Relay 636 closes a circuit from ground at its right front contact, right back contact of relay 639 and thence over lower front contacts of all previously operated hold magnets 611—816, over the inner lower normal contacts and through the winding of magnet 817 to battery. Magnet 817 thereupon operates, locks over its inner lower alternate contacts to ground on conductor 638 and in conjunction with the operated select magnet 810 causes the operation of the cross-point contact set 827. A circuit is now established from ground applied over conductor 630 and the contacts of magnet 610, over the upper front contacts of all operated hold magnets 611 to 817, inclusive, over the upper back contact of hold magnet 818, the left contacts of contact set 827, and conductor 642 to battery through the winding of relay 643. Relay 643 thereupon operates to remove ground from conductor 655 thereby permitting the operation of relay 919. Relay 919 upon operating opens the previously traced circuit over conductor 940 for operating select magnets 610, 710 and 810 whereupon these magnets release and magnet 610 upon releasing releases relay 643. Relay 643 upon releasing reconnects ground to conductor 655 whereupon such ground is reapplied over conductor 923 and the upper front contact of relay 919 to a point between the winding of relay 917 and resistance 918 whereupon relay 917 is shunted and releases. Relay 919 is now maintained operated in a circuit from battery through resistance 920, through its winding and over the upper normal contacts of relay 917 to ground on conductor 923. The crosspoint contact set 827 is now held operated by the hold magnet 817 to register the fact that the conversation lasted less than ten minutes.

It will be assumed, however, that the conversation lasted sixteen minutes and that therefore the brushes 953 and 954 have been advanced to the No. 1 terminals of their arcs and that the off-normal switch 955 has been operated to its alternate position. Therefore, the circuit previously traced to the lower movable spring of the off-normal switch 955 is extended over brush 954 and the No. 1 terminal of its arc to conductor 931 thence over conductor 621 through the windings of the No. 1 select magnets 601, 701 and 801 to battery. In this case magnet 801 upon operating followed by the operation of hold magnet 817 causes the operation of the cross-point contact set 828, the operation of relay 643, the operation of relay 919 and the release of the select magnets 601, 701 and 801 in the manner previously described. After the release of the select magnets, the cross-point contact set 828 is held operated by the hold magnet 817 to register the tens digit 1 of the elapsed time.

When relay 919 operates either following the registration of an asterisk by the operation of relay 921 or following the registration of a tens digit 0, 1, etc. by the operation of a cross-point contact set, through the operation of hold magnet 817 and prior to the release of relay 917 a circuit is established from ground over the lower front contacts of relays 917 and 919, now both operated, over the upper No. 1 contacts of relay 913, the upper No. 4 contacts of relay 914, brush 904 which is in engagement with one of the first four terminals of its arc to indicate that the conversation terminated some time during the sixth minute of a ten-minute period, to conductor 936 and thence over conductor 626 through the windings of the No. 6 select magnets 606, 706 and 806 in parallel to battery. Magnet 606 upon operating causes the release of relay 636, holding relay 639 operated as previously described over a circuit from ground on conductor 936, and the contact of magnet 606. A circuit is thereupon closed from ground over the back contact of relay 636, front contact of relay 639, front contacts of the operated hold magnets 611 to 817, inclusive, over the inner lower normal contacts and through the winding of magnet 818 to battery. Magnet 818 thereupon operates, locks over its inner lower alternate contacts to ground on conductor 638 and in conjunction with the operated select magnet 806 causes the operation of the cross-point contact set 829. A circuit is now established from ground applied over conductor 626 and the contacts of magnet 606, over the upper front contacts of operated hold magnets 611 to 818, inclusive, over the upper back contact of hold magnet 819, the left contacts of contact set 829 and conductor 642 to battery through the winding of relay 643. Relay 643 thereupon operates to remove ground from conductor 655 thereby releasing relay 919. Relay 919 upon releasing opens the previously traced circuit over conductor 936 for operating select magnets 606, 706 and 806 whereupon these magnets release, magnet 606 in turn releasing relay 643. The cross-point contact set 829 is now held operated by the hold magnet 818 to register the units digit 6 of the elapsed time.

If the conversation lasted not more than fifteen to thirty seconds and an asterisk was registered in place of a tens digit and the units timing register 900 has not advanced beyond its first four terminal stations, the circuit previously traced from ground over the lower front contacts of relays 917 and 919, the upper No. 1 contacts of relay 913 and the upper No. 4 contacts of relay 914 is extended over brush 905 and one of the first four terminals of its associated arc, over conductors 931 and 621 and through the windings of magnets 601, 701 and 801 in parallel to battery whereupon, when hold magnet 818 is operated in the manner previously described, a cross-point contact set 831 is operated to register the units digit 1.

When relay 917 releases and before relay 919 releases a circuit is established from ground over the lower back contact of relay 917, the inner lower front contact of relay 919, the upper No. 5 contacts of relay 913 through the winding of relay 929 to battery whereupon relay 929 operates. Since relay 919 releases almost immediately following the release of relay 917, the circuit of relay 929 is again opened but since relay 929 is slow to release a circuit is established from ground over the inner lower back contacts of relays 917 and 919, the contacts of relay 929 to battery through the winding of relay 911. Relay 911 thereupon operates to open the circuit of relay 912 which releases. With relay 912 released the circuit of relay 914 is opened and its upper contacts and relay 914 releases. The restoring circuit for the units timing register 900 is now established from battery through the winding and interrupter contacts of the stepping magnet 901 thereof, over the upper No. 5 back contact of relay 914, the inner lower back contact of relay 912 over the strapped terminals associated with brush 907 to ground to advance the brushes 903, 905 and 907 to the No. 22 terminals of their arcs if the register has not been advanced beyond a half revolution. With brush 907 engaging the No. 22 terminal of its arc an obvious self-interrupting circuit for magnet 901 is established for advancing the brushes of register 900 until brush 906 engages the first terminal of its arc whereupon magnet 901 is operated over the circuit previously traced to the strapped terminals of the arc associated with brush 906 and over brush 906 to ground until brush 906 engages the No. 17 terminal of its arc. A circuit is then closed from ground over brush 906 and the No. 17 terminal of its arc, over the inner and middle lower back contacts of relay 912, the upper No. 5 back contact of relay 914 to battery over the interrupter contacts and through the winding of magnet 901. Magnet 901 now operates over this circuit to advance the brushes of register 900 until brush 906 engages the No. 19 terminal of its arc, whereupon the previously traced circuit for magnet 901 is effective to advance the brushes of register 900 into their normal position in which position no circuit is effective to further operate magnet 901.

With brush 907 now in engagement with the No. 1 terminal of its arc a circuit is established from ground thereon, over the lower No. 1 back contact of relay 914 and the upper contacts of off-normal switch 955, if register 950 has been advanced from normal, over the lower back contact of relay 912 to battery through the winding of release magnet 952. Magnet 952 upon operating causes the release of brushes 953 and 954 of register 950 to their normal position whereupon the off-normal switch 955 is restored to release magnet 952. All of the information concerning a toll call of less than ninety-nine minutes duration has now been registered in the registers of the recorder.

When the conversation reaches ninety-nine minutes in duration the tens timing register 950 is advanced to position its brushes 953 and 954 upon the No. 10 terminals of their arcs by the circuit previously traced over the No. 16 terminal of the arc associated with brush 902 of the units register, after the units register has made nine complete revolutions. Since the brushes of register 950 are advanced from the No. 9 to the No. 10 terminals of their arcs upon the closure of the circuit of the stepping magnet 951 upon the engagement of brush 902 with the No. 16 terminal of its arc, and register 900 is not advanced a further step until this impulse ceases, register 900 is prevented from advancing beyond the No. 17 terminal position of the arcs associated with brushes 902, 904 and 906. With brush 906 engaging the No. 17 terminal of its arc, a circuit is established from ground thereon, over brush 953 and the No. 10 terminal of its arc through the lower winding of relay 913 to battery.

Relay 913 upon operating establishes the circuit previously traced over its lower contacts for relay 917 which operates and locks to ground on off-normal conductor 924. Since the conversation is still continuing and relay 205 of the trunk is not released, relay 915 of the recorder has not operated but relay 912 has operated. With relay 915 not operated, relay 914 is not operated and the circuit for lamp 1007 is not closed. With relay 917 operated and relay 919 unoperated, a circuit is now closed from ground over the lower front contact of relay 917, the lower front contact of relay 919, the upper No. 2 contacts of relay 913, the lower alternate contacts of off-normal springs 955, brush 954 and the No. 10 terminal of its arc, conductor 939, conductor 629 and through the windings of the No. 9 select magnets 609, 709 and 809 in parallel to battery.

Magnet 609 upon operating establishes a circuit from ground on conductor 629 over its contacts for operating relay 636 as previously described which in turn closes a circuit from ground over its front contact and the back contact of relay 639, over front contacts of operated hold magnets 611 to 816, inclusive, over the inner lower normal contacts and through the winding of hold magnet 817 to battery, whereupon magnet 817 operates, locks over its inner lower alternate contacts to ground on conductor 638 and in conjunction with the operated select magnet 809 operates the cross-point contact set 830. With the contact set 830 operated a circuit is then established from ground over conductor 629, over contacts of magnet 609, over the upper contacts of previously operated hold magnets 611 to 817, inclusive, over the upper back contact of hold magnet 818, the left contacts of contact set 830 to battery through the winding of relay 643. As previously described relay 643 upon operating permits the operation of relay 919 which in turn releases the operated select magnets 609, 709 and 809 followed by the release of relay 643. The operated cross-point contact set 830 is now held operated by the hold magnet 817 to register the tens digit 9 of the elapsed time.

With both relays 917 and 919 operated a circuit is established from ground over the lower front contact of relay 917, the lower front contact of relay 919, the upper No. 1 contacts of relay 913, the upper No. 4 back contact of relay 914 to battery through the winding of the (—) register relay 922. Relay 922 which is slow to operate operates after an interval and locks over its upper contacts to ground on off-normal conductor 924. During this interval, when relay 643 released it connected ground over its contacts, conductor 655, the inner lower back contact of relay 921, the lower back contact of relay 922, the lower contacts of relay 913, conductor 923 and over the upper front contact of relay 919 to a point between the winding of relay 917 and resistance 918 whereupon relay 917 releases. With relay 917 released, relay 919 is locked to ground on conductor 923 and over the upper normal contacts of relay 917. The (—) register relay 922, however, now operates and locks. When relay 922 operates, it opens the locking circuit of relay 919 which thereupon releases. During the interval after relay 917 is released and before relay 919 releases, a circuit is established from ground over the lower back contact of relay 917, the inner lower front contact of relay 919, the upper No. 5 contacts of relay 913 through the winding of relay 929 to battery, and relay 929 operates. When thereafter relay 919 releases it opens the circuit of relay 929 and relay 929 being slow to release a circuit is established from ground over the lower back contacts of relays 917 and 918, contacts of relay 929, through the winding of relay 911 to battery. Relay 911 thereupon operates and releases relay 912 whereupon the registers 900 and 950 are restored to normal in the manner previously described. When relay 929 releases following the release of relay 919, it opens the circuit of relay 911 but, since relays 929 and 911 are both slow to release, the circuit for reoperating relay 912 closed when relay 911 is fully released, does not become closed until both switches 900 and 950 have had time to restore. As soon as brush 953 leaves its engagement with the No. 10 terminal of its arc when switch 950 is released, the circuit of relay 913 is opened and relay 913 releases. During the time that relay 913 has been held operated, the pulsing circuit for advancing the registers 900 and 950 controlled by the fifteen-second impulses transmitted from the timer 232 of the trunk is held open and this circuit is not again effective until relay 912 has operated and relay 913 has released following the restoration of the registers 900 and 950 to normal.

Upon the release of relay 913 with the (—) register relay 922 operated, a circuit is established from battery through the winding of relay 928, over the upper No. 4 back contact of relay 913, the inner lower front contact of relay 922, the inner lower back contact of relay 921 and over conductor 655 to ground at the back contact of relay 643 whereupon relay 928 operates, locks over its upper contacts to ground on conductor 924 and recloses the circuit for operating relay 917. When relay 205 of the trunk releases to indicate the termination of conversation, relays 915, 913 and 914 operate as previously described and with relay 913 operated a circuit is established from ground over the back contact of relay 643, conductor 655, the lower back contact of relay 921, the contacts of relay 928, the lower contacts of relay 913, over the upper normal contacts and through the winding of relay 917 and through resistance 918 to battery. Relay 917 thereupon operates to initiate the registration of digits indicative of the elapsed time in excess of the previously registered ninety-nine minutes. These registrations are made in the manner previously described except that since the tens digit of the previously registered ninety-nine minutes was registered by operated cross-point contact set 830 through the operation of hold magnet 817, the tens and units digits of the additional elapsed time are now registered under the control of hold magnets 818 and 819. For the purpose of this description it may be assumed that the conversation was terminated after the registers 950 and 900 had been set to register sixteen minutes of conversation time over and above the previously registered ninety-nine minutes. In accordance with this assumption cross-point contact set 831 is operated under the joint control of select magnet 801 and hold magnet 818 to register the tens digit 1 and cross-point contact set 832 is operated under the joint control of select magnet 806 and hold magnet 819 to register the units digit 6. When relay 915 operated the lamp 1007 at the "A" switchboard also lighted.

When an operator at the "A" switchboard notes the lighting of lamp 1007 to indicate that the recorder with which it is associated has been taken for use and has recorded therein the data relating to a terminated toll call, she inserts the answering plug of one of her cord circuits, such as the plug 1009 of the cord circuit 1010 into the jack 1008 with which the lamp 1007 is associated whereupon a circuit is established from ground through the upper left winding of repeating coil 1011 over the upper normal contacts of ringing key 1012, tips of plug 1009 and jack 1008, conductor 327 over the upper No. 5 contacts of relay 319 and brush 321 of the trunk-finder 300, conductor 212, thence as traced over the connection established to the calling private branch exchange 100, returning over conductor 213, brush 322 and the upper No. 4 contacts of relay 319 of the trunk-finder 300, conductor 328, rings of jack 1008 and plug 1009, over the lower normal contacts of key 1012, through the winding of supervisory relay 1013 to battery through the lower left winding of repeating coil 1011. Relay 1013 operates in this circuit and establishes a circuit from battery over its contacts, through resistance 1014 in shunt of answering supervisory lamp 1015, through resistance 1016, over the sleeves of plug 1009 and jack 1008, through the winding of printer connector relay 1017. Relay 1017 thereupon operates to establish a circuit over its upper No. 8 contacts for relay 1051, to establish a circuit over its upper No. 9 contacts for relay 1018 and to establish control circuits over its remaining contacts between the printer 1050 and the progress switch 1000 of the recorder. Relay 1018 upon operating connects ground over its front contacts to conductor 910 for holding relay 909 operated and to thereby maintain ground on sleeve conductor 201 of the calling trunk to prevent the release of selector 102 and line-finder 101 following the release of the connection at the private branch exchange. Relay 1018 also causes the operation of relay 1006 which thereupon operates and locks to ground applied to conductor 916 by operated relay 915. Relay 1051 upon operating connects the commercial source of alternating current 1052 to the driving motor 1053 of the printer whereupon the brush arm 1054 of the printer is started to rotate its brush 1055 over the segments of the distributor of the printer.

When ground was connected to conductor 924 by the operation of relay 915 following the release of the connection and the consequent release of relay 205 of the trunk, a circuit was completed from such grounded conductor over the normal terminal of the arc associated with brush 1002 of the progress switch 1000, over brush 1002, over the interrupter contacts and through the winding of stepping magnet 1001 to battery, whereupon magnet 1001 is operated and released once to advance the brushes of the progress switch one step. With the brushes 1002 and 1004 of switch 1000 on the No. 2 terminals of their arcs and the printer control conductors 1061 to 1075 extended over contacts of printer connector relay 1017 and conductors 1021 to 1035, respectively, a circuit is established from ground on off-normal ground conductor 924, over the normal contacts of stepping relay 1019, over brush 1004 and the No. 2 terminal of its arc, conductor 1031, the upper No. 3 contacts of relay 1017, conductor 1071 to the (*) segment of the distributor of printer 1050. Since the brush arm 1054 of the distributor and type-wheel are being rotated by the motor 1053, when the brush 1055 of arm 1054 engages the (*) segment to which ground potential has been applied, a circuit is completed over that segment, brush 1055 and ring 1056, to battery through the winding of print magnet 1057. The armature of magnet 1057 carries a stabber which enters a slot in the distributor when the selected character has been positioned for printing thereby arresting the rotation of the printer shaft and pressing the ticket tape against the type-wheel to print the selected character, in this case an asterisk.

When the stabber enters the slot the contacts shown associated with the magnet 1057 are closed whereupon ground is connected over conductors 1074 and 1075, the upper No. 6 and 7 contacts of relay 1017, to conductors 1034 and 1035. With ground connected to conductor 1034 the circuit of relay 1019 is completed and relay 1019 operates locking over its upper contacts to ground connected to conductor 1035; establishing a circuit for stepping magnet 1001 which may be traced from ground over conductor 924, over the lower alternate contacts of relay 1019, through the winding of magnet 1001 to battery; and opening at its normal contacts the previously traced circuit of print magnet 1057. Magnet 1057 thereupon releases and when the stabber is entirely removed from the slot in the distributor the locking circuit of relay 1019 is opened and relay 1019 releases in turn releasing magnet 1001 to advance brushes 1002 and 1004 of progress switch 1000 to the No. 3 terminals of their arcs. Magnet 1057 upon releasing also permits the motor 1053 to again rotate the type-wheel and brush arm 1054 of the printer. When the brush 1004 engages the No. 3 terminal of its arc the ticket printer is controlled in the manner just described to print a second asterisk on the ticket whereupon brushes 1002 and 1004 of switch 1000 are again advanced to the No. 4 terminals of their arcs.

It has been assumed that the office in which the calling line is located is designated by the office code letters A, U, D having the digital equivalents 2, 8, 3 and that these digits have been registered by the operation of the cross-point contact sets 641, 644 and 645 of Fig. 6. When brush 1004 engages the No. 4 terminal of its arc a circuit is established from ground applied thereover, over conductor 655, the right contacts of cross-point contact set 641, conductors 672 and 1022, the lower No. 7 contacts of relay 1017, conductor 1062 to the No. 2 distributor segment of the printer. In the manner previously described the rotation of the printer type-wheel is arrested by the operation of the print magnet 1057 when the brush 1055 engages the No. 2 segment, the numeral 2 is printed on the ticket and progress switch 1000 is controlled to advance its brushes 1002 and 1004 to the No. 5 terminals of their arcs.

With brush 1004 engaged with the No. 5 terminal of its arc, a circuit is established from ground thereover, over conductor 657, the right contacts of cross-point contact set 644, conductors 678 and 1028, the lower No. 1 contacts of relay 1017 and conductor 1068 to the No. 8 distributor segment of the printer. In the manner previously described the rotation of the printer type-wheel is arrested by the operation of the print magnet 1057 when the brush 1055 engages the No. 8 segment, the numeral 8 is printed on the ticket and progress switch 1000 is controlled to advance its brushes 1002 and 1004 to the No. 6 terminals of their arcs. When brush 1004 is engaged in the No. 6 terminal of its arc, a circuit is established from ground thereover, over conductors 658, the right contacts of the cross-point contact set 645, conductors 673 and 1023, the lower No. 6 contacts of relay 1017 and conductor 1063 to the No. 3 distributor segment of the printer. In the manner previously described, the rotation of the printer type-wheel is arrested by the operation of the print magnet 1057 when brush 1055 engages the No. 3 segment, the numeral 3 is printed on the ticket and progress switch 1000 is controlled to advance its brushes 1002 and 1004 to the No. 7 terminals of their arcs.

With brush 1004 engaged with the No. 7 terminal of its arc, a circuit is established from ground thereover, over conductor 1032, the upper No. 4 contacts of relay 1017, conductor 1072 to the (—) distributor segment of the printer. In the manner previously described the rotation of the printer type-wheel is arrested by the operation of the print magnet 1057 when the brush 1055 engages the (—) segment, a dash is printed on the ticket and progress switch 1000 is controlled to advance its brushes 1002 and 1004 to the No. 8 terminals of their arcs.

It has been assumed that the calling line number as registered in the register of Fig. 6 is 9095 and that cross-point contact sets 647, 648, 649 and 650 have been operated. When, therefore, brush 1004 is engaged with the No. 8 terminal of its arc a circuit is established from ground thereover, over conductor 659, the right contacts of the cross-point contact set 647, conductors 679 and 1029, the upper No. 1 contacts of relay 1017 and conductor 1069 to the No. 9 distributor segment of the printer. In the manner previously described, the rotation of the printer type-wheel is arrested by the operation of the print magnet 1057 when brush 1055 engages the No. 9 segment, the numeral 9 is printed on the ticket and progress switch 1000 is controlled to advance its brushes 1002 and 1004 to the No. 9 terminals of their arcs. In a similar manner the printer is controlled to print the hundreds digit 0, the tens digit 9 and the units digit 5 as the brush 1004 engages the Nos. 9, 10 and 11 position terminals of its arc and applies ground successively over conductors 660, 661 and 662, and the right contacts of cross-point sets 648, 649 and 650. Following the printing of the units digit of the calling line number, brushes 1002 and 1004 of progress switch 1000 are advanced into engagement with the No. 12 terminals of their arcs. With brush 1004 engaged with the No. 12 terminal of its arc, ground is connected thereover to conductor 1032, and thence as traced to the (—) distributor segment of the printer whereupon a dash is printed upon the ticket and progress switch 1000 is controlled to advance its brushes 1002 and 1004 into engagement with the No. 13 terminals of their arcs.

It has been assumed that the month, day, hour and fraction of the hour when the toll call was made was December 25 at 9:36 o'clock and that this data has been registered as digits 1225096 by the operation of the cross-point contact sets 651, 652 and 653 of Fig. 6 and cross-point contact sets 721, 722, 723 and 724 of Fig. 7.

With brush 1004 engaged with the No. 13 terminal of its arc, ground is connected thereover over conductor 663, the right contacts of the cross-point contact set 651, conductors 671 and 1021, the lower No. 8 contacts of relay 1017, conductor 1061 to the No. 1 distributor segment of the printer. In the manner previously described the rotation of the printer type-wheel is arrested by the operation of the print magnet 1057 when brush 1055 engages the No. 1 segment, the tens digit of the month, in this case the digit 1, is printed on the ticket and progress switch 1000 is controlled to advance its brushes to the No. 14 terminals of their arcs. Thereafter the brushes 1002 and 1004 are advanced over the Nos. 14 to 19 terminals of their arcs and control circuits are established successively over conductors 664, 665, 731, 732, 733 and 734 and the right contacts of cross-point contact sets 652, 653, 721, 722, 723 and 724 to control the printer to print the units digit 2 of the month designation, the tens digit 2 and the units digit 5 of the day of the month, the tens digit 0 and the units digit 9 of the hour of the day and the digit 6 designating the sixth-tenths of an hour or thirty-six minutes. Following the control of the printer to print the last digit of the time of day, brushes 1002 and 1004 are advanced into engagement with the No. 20 terminals of their arcs and the printer is controlled over conductor 1032 to print a dash on the ticket. Following the printing of the dash on the ticket the switch 1000 is controlled to advance its brushes 1002 and 1004 into engagement with the No. 21 terminals of their arcs.

It has been assumed that the No. 00 sender and the No. 0 identifier were used on the established toll connection and that accordingly the cross-point sets 725, 726 and 727 have been operated to register the three zero digits of these numbers. When, therefore, the brush 1004 of the progress switch 1000 engages the No. 21 terminal of its arc ground is connected thereover, over conductor 735, the right contacts of cross-point contact set 725, conductors 680 and 1030, the upper No. 2 contacts of relay 1017, conductor 1070 to the No. 0 distributor segment of the printer. In the manner previously described the rotation of the printer type-wheel is arrested by the operation of the print magnet 1057 when brush 1055 engages the No. 0 segment, the tens digit 0 of the sender number is printed on the ticket and the progress switch 1000 is controlled to advance its brushes 1002 and 1004 to the No. 22 terminals of their arcs. In a similar manner as the brushes 1002 and 1004 are advanced over the Nos. 22 and 23 terminals of their arcs, control circuits are established successively over conductors 736 and 737 and the right contacts of crosspoint contact sets 726 and 727 to control the printer to print the units digit 0 of the sender member and the digit 0 of the identifier member on the toll ticket. These numbers may be used in the event any difficulty is encountered in the operation of the sender and identifier for identifying the faulty apparatus. When the brushes 1003 and 1005 engage the No. 1 terminals of their arcs following the printing of the sender number, ground is applied over brush 1005 and the No. 1 terminal of its arc to conductor 1032 to control the printer to print a dash on the ticket whereupon the switch 1000 is controlled to advance its brushes 1003 and 1005 into engagement with the No. 2 terminals of their arcs.

It has been assumed that the called office code letters of the line to which the toll call has been extended are M, A, R and that consequently the office code digits 6, 2, 7 have been registered in the recorder by the operation of the cross-point contact sets 728, 729 and 730. When, therefore, brush 1005 is engaged with the No. 2 terminal of its arc, a circuit is established from ground thereover, over conductor 738, the right contacts of cross-point contact set 728, conductors 676 and 1026, over the lower No. 3 contacts of relay 1017 and conductor 1066 to the No. 6 distributor segment of the printer. In the manner previously described the rotation of the printer type-wheel is arrested by the operation of the print magnet 1057 when brush 1055 engages the No. 6 segment, the numeral 6 is printed on the ticket and progress switch 1000 is controlled to advance its brushes 1003 and 1005 into engagement with the No. 3 terminals of their arcs. In a similar manner the printer is controlled to print the second code digit 2 and the third code digit 7 as the brush 1005 engages the Nos. 3 and 4 terminals of its arc and applies ground successively over conductors 739 and 740 and the right contacts of the cross-point contact sets 729 and 730. Following the printing of the third called office code digit, brushes 1003 and 1005 of the progress switch 1000 are advanced into engagement with the No. 5 terminals of their arcs.

With brush 1005 engaged with the No. 5 terminal of its arc, ground is connected thereover to conductor 1033, over the upper No. 5 contacts of relay 1017, conductor 1073, to battery through the winding of cut magnet 1058 of the printer. Magnet 1058 upon operating cuts off the tape just ahead of the first notation of the incident call whereby the ticket made for the previous call is detached, and ground is connected to the conductors 1074 and 1075 for controlling switch 1000 to engage its brushes 1003 and 1005 with the No. 6 terminals of their arcs and to release the cut magnet 1058 of the printer. With brush 1005 engaged with the No. 6 terminal of its arc a circuit is established from ground thereover, over conductor 1032 and thence as traced to the (—) distributor segment of the printer whereupon the printer is controlled to print a dash on the ticket and the switch 1000 is controlled to advance its brushes 1003 and 1005 into engagement with the No. 7 terminals of their arcs.

It has been assumed that the called line number was 1345 and that consequently the digits of this number have been registered in the recorder by the operation of the cross-point contact sets 821, 822, 823 and 824. When, therefore, brush 1005 is engaged with the No. 7 terminal of its arc a control circuit is extended from ground thereover over conductor 834, the right contacts of cross-point contact set 821, conductors 671 and 1021, the lower No. 8 contacts of relay 1017 and conductor 1061 to the No. 1 distributor segment of the printer. In the manner previously described, the rotation of the printer type-wheel is arrested by the operation of the print magnet 1057 when brush 1055 engages the No. 1 segment, the thousands digit 1 is printed on the ticket and progress switch 1000 is controlled to advance its brushes 1003 and 1005 into engagement with the No. 8 terminals of their arcs. In a similar manner the printer is controlled to print the hundreds digit 3, the tens digit 4 and the units digit 5 as the brush 1005 engages the Nos. 8, 9 and 10 terminals of its arc and applies ground successively over conductors 835, 836 and 837 and over the right contacts of the cross-point contact sets 822, 823 and 824. Following the printing of the units digit, brushes 1003 and 1005 of the progress switch 1000 are advanced into engagement with the No. 11 terminals of its arc and ground is thereupon applied over brush 1005, over conductor 1032 and thence as traced to the (—) distributor segment of the printer, whereupon the printer is controlled to print a dash on the ticket and the switch 1000 is controlled to advance its brushes 1003 and 1005 into engagement with the No. 12 terminals of their arcs.

It has been assumed that the private branch exchange class has been registered in the recorder by the operation of cross-point contact set 825 to register the digit 5 and that the initial charge rate for the call has been registered in the recorder by the operation of the cross-point contact set 826 to register the digit 2. When, therefore, brush 1005 is engaged with the No. 12 terminal of its arc, a control circuit is established from ground thereover, over conductor 838, the right contacts of cross-point contact set 825, conductors 675 and 1025, the lower No. 4 contacts of relay 1017 and conductor 1065 to the No. 5 distributor segment of the printer. In the manner previously described the rotation of the printer type-wheel is arrested by the operation of the print magnet 1057 when brush 1055 engages the No. 5 segment, the class digit 5 is printed on the ticket and progress switch 1000 is controlled to advance its brushes 1003 and 1005 into engagement with the No. 13 terminals of their arcs. With brush 1005 engaged with the No. 13 terminal of its arc, a control circuit is established from ground thereover, over conductor 839, the right contacts of cross-point contact set 826, conductors 672 and 1022, the lower No. 7 contacts of relay 1017 and conductor 1062 to the No. 2 distributor segment of the printer. In the manner previously described the rotation of the printer type-wheel is arrested by the operation of the print magnet 1057 when brush 1055 engages the No. 2 segment, the rate digit 2 is printed on the ticket and progress switch 1000 is controlled to advance its brushes 1003 and 1005 into engagement with the No. 14 terminals of their arcs. Following the printing of the rate digit and with brush 1005 engaging the No. 14 terminal of its arc, ground is applied thereover to conductor 1032 and thence as traced to the (—) distributor segment of the printer whereupon the printer is controlled to print a dash on the ticket and the progress switch 1000 is controlled to advance its brushes 1003 and 1005 into engagement with the No. 15 terminals of their arcs.

It has been assumed that the elapsed time of the conversation was sixteen minutes and that the cross-point contact sets 828 and 829 of the register of Fig. 8 have been operated to register the tens digit 1 and the units digit 6 of the elapsed time. When therefore brush 1005 is engaged with the No. 15 terminal of its arc a circuit is established from ground thereover, over conductor 1020, the lower back contact of relay 921, conductor 840, the right contacts of the cross-point contact set 828, conductors 671 and 1021, the lower No. 8 contacts of relay 1017, conductor 1061 to the No. 1 distributor segment of the printer. In the manner previously described the rotation of the printer type-wheel is arrested by the operation of the print magnet 1057 when brush 1055 engages the No. 1 segment, the numeral 1 is printed on the ticket and progress switch 1000 is controlled to advance its brushes 1003 and 1005 into engagement with the No. 16 terminals of their arcs. With brush 1005 engaged with the No. 16 terminal of its arc a circuit is established from ground thereover, over the No. 1 back contact of relay 1036, conductor 1037, the lower back contact of relay 927, conductor 841, the right contacts of the cross-point contact set 829, conductors 676 and 1026, the lower No. 3 contacts of relay 1017 and conductor 1066 to the No. 6 distributor segment of the printer. In the manner previously described, the rotation of the printer type-wheel is arrested by the operation of the print magnet 1057 when brush 1055 engages the No. 6 segment, the numeral 6 is printed on the ticket and progress switch 1000 is controlled to advance its brushes 1003 and 1005 into engagement with the No. 17 terminals of their arcs.

A circuit is now completed from ground applied over brush 1005, now in engagement with the No. 17 terminal of its arc, over the No. 2 back contact of relay 1036, conductor 1031, the upper No. 3 contacts of relay 1017 and conductor 1071 to the (*) distributor segment of the printer. In the manner previously described, the rotation of the printer type-wheel is arrested by the operation of the print magnet 1057 when brush 1055 engages the (*) segment, an asterisk is printed on the ticket and progress switch 1000 is controlled to advance its brushes 1003 and 1005 into engagement with the No. 18 terminals of their arcs. With brush 1005 in engagement with the No. 18 terminal of its arc, a circuit is established from ground thereover over the No. 3 back contact of relay 1036, conductor 1031, the upper No. 3 contacts of relay 1017 and conductor 1071 to the (*) segment of the distributor of the printer to cause the printer to print another asterisk on the ticket and to control the advance of the brushes 1003 and 1005 of the progress switch into engagement with the No. 19 terminals of their arcs. Ground is thereupon connected over brush 1005 and the No. 19 terminal of its arc to conductor 842 but since for the assumed call no cross-point contact set with which conductor 842 is associated has been operated, no circuit is completed in this position of the progress switch and such switch makes no further advance.

If the call was of very short duration, for example only fifteen or thirty seconds, and as a consequence the (*) register relay 921 was operated followed by the operation of relay 927 and the operation of the cross-point contact set 828 as previously described, then with brush 1005 engaging the No. 15 terminal of its arc following the printing of the units digit of the called line number and the dash following such digit, a circuit is established from ground over brush 1005, conductor 1020, the lower front contact of relay 921, conductor 941, conductor 1031, the upper No. 3 contacts of relay 1017 and conductor 1071 to the (*) distributor segment. In the manner previously described the rotation of the type-wheel is arrested by the operation of the print magnet 1057 when brush 1055 engages the (*) segment, an asterisk is printed on the ticket and progress switch 1000 is controlled to advance its brushes 1003 and 1005 into engagement with the No. 16 terminals of their arcs.

With brush 1005 engaged with the No. 16 terminal of its arc a circuit is established thereover, over the No. 1 back contact of relay 1036, conductor 1037, the lower front contact of relay 927, conductor 840, the right contacts of cross-point contact set 828, conductors 671 and 1021, the lower No. 8 contacts of relay 1017 and conductor 1061 to the No. 1 distributor segment of the printer. In the manner previously described the rotation of the type-wheel is arrested by the operation of the print magnet 1057 when brush 1055 engages the No. 1 segment, the numeral 1 is printed on the ticket and the progress switch 1000 is controlled to advance its brushes 1003 and 1005 into engagement with the No. 17 terminals of their arcs. The notation *1 has now been printed on the ticket to indicate a toll call of very short duration. Following the printing of the numeral 1 two asterisks are printed on the ticket in the manner previously described.

If the call was one of over ninety-nine minutes duration, for example, one of one hundred and sixteen minutes duration, and as a consequence (—) register relay 922 and cross-point contact sets 830, 831 and 832 have been operated in the manner previously described, then the ticket printer is controlled to print the following notation on the ticket 9—16, a numeral 9 followed by a dash being printed instead of 99. When register relay 922 operated a circuit was established from ground over its lower contacts and conductor 942 through the winding of relay 1036 to battery for operating relay 1036. When thereafter brush 1005 engages the No. 15 terminal of its arc following the printing of the units digit of the called line number and the dash following such digit, a circuit is established from ground over brush 1005, conductor 1020, the lower back contact of relay 921, conductor 840, over the right contacts of cross-point contact set 830, conductors 679 and 1029, the upper No. 1 contacts of relay 1017 and conductor 1069 to the No. 9 distributor segment of the printer. In the manner previously described, the rotation of the type-wheel is arrested by the operation of the print magnet 1057 when the brush 1055 engages the No. 9 segment, the numeral 9 is printed on the ticket and the progress switch is controlled to advance its brushes 1003 and 1005 into engagement with the No. 16 terminals of their arcs.

With brush 1005 engaged with the No. 16 terminal of its arc, a circuit is established thereover, over the No. 1 front contact of relay 1036, conductor 1032, the upper No. 4 contacts of relay 1017 and conductor 1072 to the (—) segment of the printer distributor whereupon, when the brush 1055 engages such segment, the print magnet 1057 is operated to stop the rotation of the type-wheel to print a dash on the ticket and to control the advance of the progress switch 1000 to position its brushes 1003 and 1005 upon the No. 17 terminals of their arcs. A circuit is thereupon established from ground over brush 1005 and the No. 17 terminal of its arc, over the No. 2 front contact of relay 1036 and thence as just traced to the (—) segment of the distributor of the printer whereupon another dash is printed on the ticket and the progress switch 1000 is controlled to advance its brushes 1003 and 1005 into engagement with the No. 18 terminals of their arcs.

When brush 1005 engages the No. 18 terminal of its arc, a circuit is established from ground thereover, over the No. 3 front contact of relay 1036, conductor 1037, the lower back contact of relay 927, conductor 841, the right contacts of cross-point contact set 831, conductors 671 and 1021, the lower No. 8 contacts of relay 1017 and conductor 1061 to the No. 1 distributor segment of the printer. In the manner previously described, the rotation of the type-wheel is arrested by the operation of print magnet 1057 when brush 1055 engages the No. 1 segment, the numeral 1 is printed on the ticket and the progress switch 1000 is controlled to advance its brushes 1003 and 1005 into engagement with the No. 19 terminals of their arcs. With brush 1005 engaged with the No. 19 terminal of its arc, a circuit is established from ground thereover, over conductor 842, the right contacts of the cross-point contact set 832, conductors 676 and 1026, the lower No. 3 contacts of relay 1017 and conductor 1066 to the No. 6 distributor segment of the printer whereupon, when brush 1055 engages such segment, the print magnet 1057 is operated to arrest the rotation of the type-wheel, to print the numeral 6 on the ticket and to control the advance of the brushes 1003 and 1005 of the progress switch 1000 into engagement with the No. 20 terminals of their arcs.

A circuit is now established from ground over brush 1005 and the No. 20 terminal of its arc, over the No. 4 front contact of relay 1036, conductor 1031, the upper No. 3 contacts of relay 1017 and conductor 1071 to the (*) distributor segment whereupon the printer is controlled to print an asterisk on the ticket and the progress switch 1000 is controlled to advance its brushes 1003 and 1005 into engagement with the No. 21 terminals of their arcs. The circuit just traced is now reestablished to control the printing of another asterisk on the ticket whereupon the brushes 1003 and 1005 of the progress switch are advanced into engagement with the No. 22 terminals of their arcs. There being no connection to the No. 22 terminal of the arc with which brush 1005 is now engaged, the progress switch does not advance further.

The operator at the "A" switchboard upon noting the completion of the printing of the toll ticket makes the necessary computation from the charge rate, the elapsed time and the time of day printed on the ticket, connects her headset 1038 by the operation of the cord circuit listening key 1039 to the cord circuit which she has plugged into the recorder jack 1008 and then communicates the necessary information concerning the toll call including the computed charge to the attendant at the private branch exchange. After she has thus communicated the information she withdraws the cord circuit plug 1009 from the jack 1008 thereby releasing relay 1017 to disconnect her position printer from the recorder. Relay 1017 upon releasing also releases relay 1018 and with relay 1006 locked operated removes ground from conductor 910 thereby releasing the off-normal relay 909 of the recorder.

Relay 909 upon releasing removes ground from off-normal ground conductors 924 and 638 thereby releasing all of the operated hold magnets of the registers of Figs. 6, 7 and 8 and all operated relays of Fig. 9. At its upper front contacts relay 909 removes ground from conductor 307 thereby initiating the release of the recorder-trunk-finder 300 which thereupon restores to normal in the usual manner. At its inner lower contacts relay 909 also removes ground from conductor 329 which is connected over the lower No. 3 contacts of relay 319 and brush 323 of the trunk-finder 300 and conductor 214 of the trunk to the sleeve conductor of the trunk 106 whereupon the line-finder 101 and selector 102 by which the private branch exchange is connected to the trunk 106 are released. Relay 1018 upon releasing also establishes a circuit for restoring the progress switch 1000 to normal which circuit may be traced from ground over its back contact, over the strapped terminals of the arcs with which brushes 1002 and 1003 are associated, over one of these brushes and over the interrupter contacts and through the winding of the stepping magnet 1001 to battery. Magnet 1001 is thereupon intermittently operated until the brush 1003 leaves the last terminal of its arc, in which position the circuit of magnet 1001 is opened. All apparatus employed on the toll call has now been released.

As an alternative operating procedure, if it should be considered undesirable to keep the private branch attendant in on the connection to the "A" switchboard until the ticket has been printed and the "A" switchboard operator has communicated the information to the attendant, which proceedings may require from twenty to thirty seconds, the private branch exchange attendant may upon disconnection release the connection to the trunk and release the trunk-finder 300, but the recorder lamp 1007 at the "A" switchboard would be lighted as previously described. When the "A" operator answers with a cord circuit the ticket would be printed in the manner previously described. After computing the charge for the call the "A" operator may then originate a call to the private branch exchange to inform an attendant of the charge for the call.

What is claimed is:

1. In an automatic ticketing system a calling private branch exchange line, a trunk having a ticket printer therein, means for extending a connection from said line to said trunk, a plurality of senders, means responsive to the seizure of said trunk for associating an idle sender therewith, a calling line identifier, means for associating said identifier with said sender, means in said identifier for identifying the calling line in accordance with its number and class and for causing the registration thereof in said sender, a connector for associating said sender with said trunk whereby control circuits are normally established for controlling the ticket printer in accordance with call data registrations in said sender, a plurality of recorders, means responsive to the identification of the calling line as a private branch exchange line for signaling the trunk that the printer thereof shall print no ticket and for associating an idle one of said recorders with said trunk and with said sender whereby said sender and trunk are effective to register the call data therein, an operator's position accessible to said calling line through said recorder and trunk, a ticket printer at said position and means operative upon the response of the operator for causing the operation of said latter printer in accordance with the call data registered in said recorder to enable said operator to communicate said data to said calling line.

2. In an automatic ticketing system, a calling line, a trunk, means for extending a connection from said line to said trunk, a plurality of recorders, means responsive to the seizure of said trunk for associating an idle recorder therewith, means in said recorder for registering therein all of the data relating to a toll connection established from said line over said trunk, an operator's position, a jack and lamp for each recorder at the switchboard of said position, means for lighting the lamp of the recorder associated with a trunk when a call over said trunk is terminated, cord circuits at said operator's position, a printer at said operator's position, and means responsive to the connection of a cord circuit with the jack of the seized recorder for associating said printer with said recorder whereby said printer is controlled to print a toll ticket in accordance with the data registered in said recorder.

3. In an automatic ticketing system, a calling line, a trunk, means for extending a toll connection from said line over said trunk to a desired line, a plurality of recorders, means responsive to the seizure of said trunk for associating an idle recorder therewith, registering switches in said recorder controllable from said trunk to register the elapsed time of the conversation for the toll connection established over said trunk, registering means in said recorder for registering all of the data relating to said toll connection including the elapsed time registered by said switches, an operator's position, a jack and lamp for each recorder at the switchboard of said position, means for lighting the lamp of the recorder associated with a trunk when the conversation over said trunk is terminated, cord circuits at said operator's position, a printer at said operator's position, and means responsive to the connection of a cord circuit with the jack of the seized recorder for associating said printer with said recorder whereby said printer is controlled to print a toll ticket in accordance with the data registered in the registering means of said recorder.

4. In an automatic ticketing system, a calling line, a trunk, means for extending a toll connection from said line over said trunk to a desired line, a plurality of recorders, means responsive to the seizure of said trunk for associating an idle recorder therewith, registering means in said recorder for registering all of the data relating to a toll connection established over said trunk, registering switches in said recorder operable during the conversational period of a connection established over said trunk, means operated upon the termination of the conversation to transfer the settings of said switches to certain of said registering means, an operator's position, a jack and lamp for each recorder at the switchboard of said position, means for lighting the lamp of the recorder associated with a trunk when the conversation over said trunk is terminated, cord circuits at said operator's position, a printer at said position and means responsive to the connection of a cord circuit with the jack of a seized recorder for associating said printer with said recorder whereby said printer is controlled to print a toll ticket in accordance with the data registered in the registering means of said recorder.

5. In an automatic ticketing system, a calling line, a trunk, switching means for extending a toll connection from said line over said trunk to a desired line, a plurality of recorders each having registering means for registering all of the data relating to a toll connection established over a toll trunk, means operative upon the seizure of a trunk for associating an idle recorder therewith, an operator's position, a jack and lamp for each recorder at the switchboard of said position, means controlled from said line upon the termination of a conversation over an established connection for lighting the lamp of the recorder associated with said jack and for releasing said trunk and the connection extended therefrom, means controlled from the recorder for holding the connection established from said line to said recorder, cord circuits at said operator's position, a printer at said position, means responsive to the connection of a cord circuit with the jack of a seized recorder for associating said printer with said recorder whereby said printer is controlled to print a toll ticket in accordance with the data registered in the registering means of said recorder, and means effective upon the disconnection of said cord circuit from said jack to restore said recorder and to release the connection from said line to said recorder.

6. In an automatic ticketing system, a calling line, a trunk, means for extending a connection from said line to said trunk, a plurality of senders, means responsive to the seizure of said trunk for associating an idle sender therewith, a calling line identifier, means for associating said identifier with the sender taken for use, means in said identifier for identifying the calling line in accordance with its number and class and for causing the registration thereof in said sender, means in said sender for registering other data relating to a toll call established under the control of said sender over said trunk, a plurality of recorders each having an associated trunk-finder for associating such recorder with a seized trunk and registering means, a three-way connector circuit operable from said sender to first establish control circuits from said sender to said trunk whereupon the trunk-finder of an idle recorder is operated to associate such recorder with said trunk, means operative upon the seizure of said trunk by said recorder to establish further control circuits over said connector circuit from said sender to said recorder over which the registrations in said sender may be transferred to the registering means of said recorder, and a printer associable with said recorder and controllable in accordance with the settings of the registering means thereof to print a toll ticket.

7. In an automatic ticketing system, a calling private branch exchange line, a trunk having a ticket printer and elapsed time measuring registers therein, means for extending a connection from said line to said trunk, a plurality of senders, means responsive to the seizure of said trunk for associating an idle sender therewith, registers in said sender for registering the call data of an established toll call, a calling line identifier, means for associating said identifier with said sender, means in said identifier for identifying the calling line in accordance with its number and class and for causing the registration thereof in said sender, a connector for establishing control circuits from said sender to said trunk over which said printer is controlled in accordance with the call data registered in said sender, a plurality of recorders having means for registering the data of an established toll call therein and elapsed time measuring registers, means responsive to the identification of the calling line as a private branch exchange line for associating an idle one of said recorders with said trunk, a transfer relay in said connector, means responsive to the identification of the calling line as a private branch exchange line for signaling said trunk to control the elapsed time registers of said recorder in lieu of the elapsed time registers of said trunk and to operate said transfer relay whereby said sender controls the registering means of said recorder rather than the ticket printer of said trunk in accordance with all of the call data registered in said sender, and a ticket printer associable with said recorder and controllable to print a toll ticket in accordance with the call data registered in said recorder.

ALOYSIUS J. BUSCH.